United States Patent [19]

McMurray

[11] Patent Number: 5,446,643
[45] Date of Patent: Aug. 29, 1995

[54] HARMONIC BLOCKING CONVERTER SYSTEM

[75] Inventor: William McMurray, Schenectady, N.Y.

[73] Assignee: Electric Power Research Institute, Inc., Palo Alto, Calif.

[21] Appl. No.: 193,442

[22] Filed: Feb. 8, 1994

Related U.S. Application Data

[63] Continuation-in-part of Ser. No. 881,403, May 11, 1992, abandoned.

[51] Int. Cl.6 ............................................. H02M 1/12
[52] U.S. Cl. ..................................... 363/40; 363/43; 363/71; 307/105
[58] Field of Search .................. 363/39, 40, 42, 43, 363/71, 72; 323/361; 307/105

[56] References Cited

U.S. PATENT DOCUMENTS 3,876,923 4/1975 Humphrey et al. .................. 363/71
5,138,544 8/1992 Jessee ..................................... 363/43
5,198,746 3/1993 Gyugyi et al. ...................... 323/207

*Primary Examiner*—Steven L. Stephan
*Assistant Examiner*—Adolf Berhane
*Attorney, Agent, or Firm*—Flehr, Hohbach, Test, Albritton & Herbert

[57] ABSTRACT

A harmonic blocking converter system for converting power between an AC source and a DC source includes a harmonic blocking transformer and a converter which generates undesirable harmonic currents including fifth and seventh harmonic components. The harmonic blocking transformer includes a polyphase main transformer and a harmonic blocker coupled with wye and delta secondary windings of the main transformer, so as to substantially block passage of the fifth and seventh harmonic currents to the AC source. A waveform enhancer may couple the harmonic blocking transformer with the converter. The converter may be constructed for 2-level operation, or, with the addition of auxiliary diodes, for 3-level operation. Such a harmonic blocking transformer and a method of blocking undesirable harmonic currents are also provided.

11 Claims, 10 Drawing Sheets

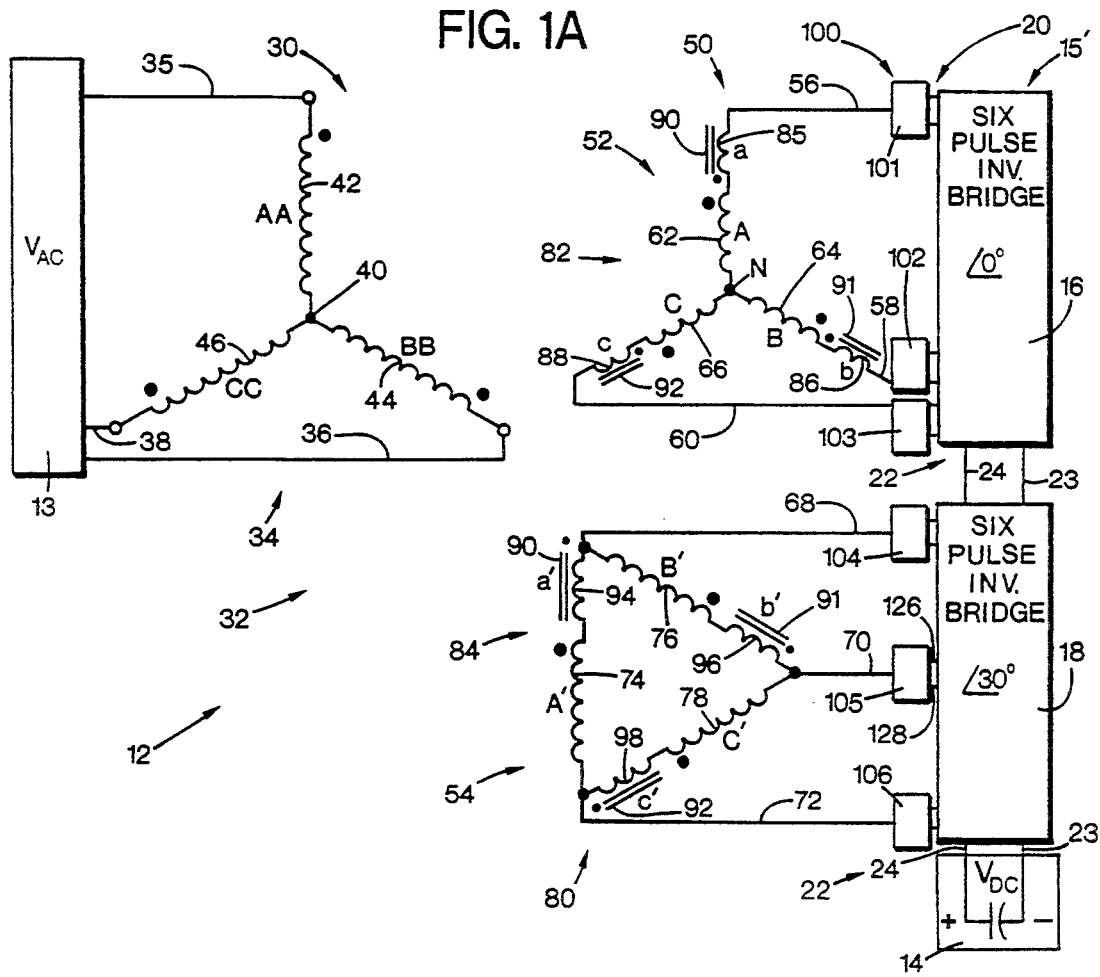
FIG. 1A
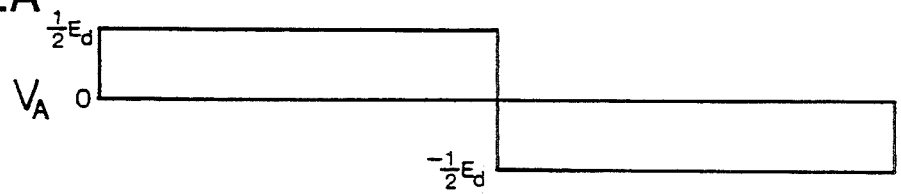
FIG. 2A
FIG. 2B
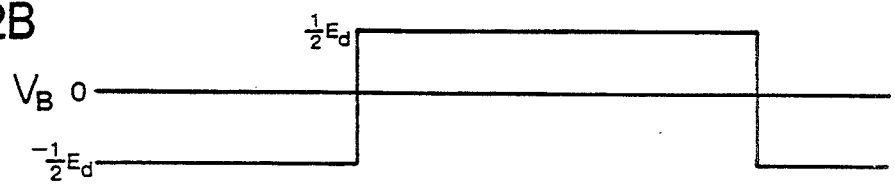
FIG. 2C

FIG. 2D $V_N$
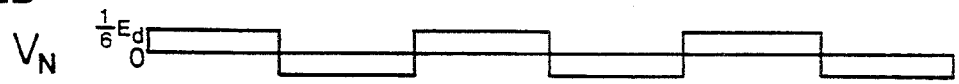
FIG. 2E $V_{AN}$
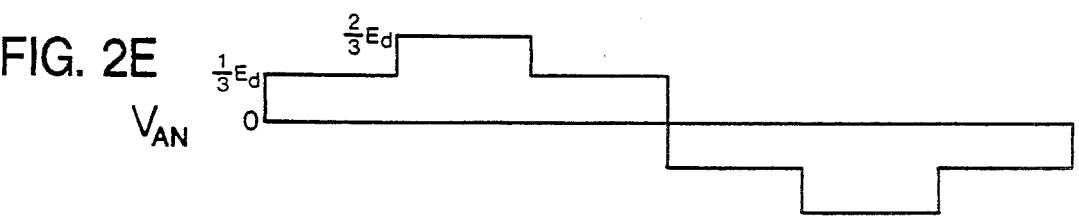
FIG. 2F $N\phi_{AN}$
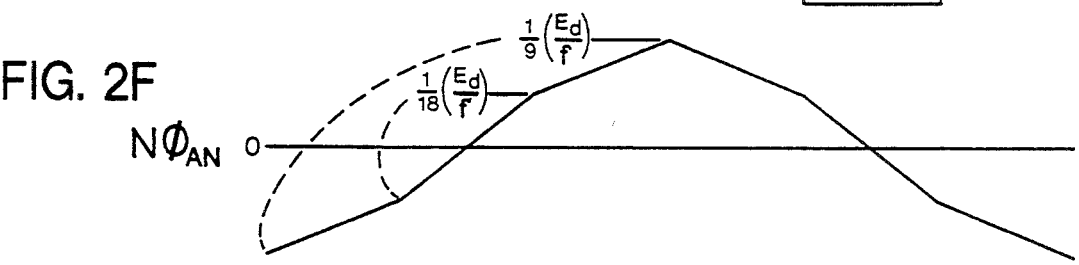
FIG. 3A $V_{A'}$
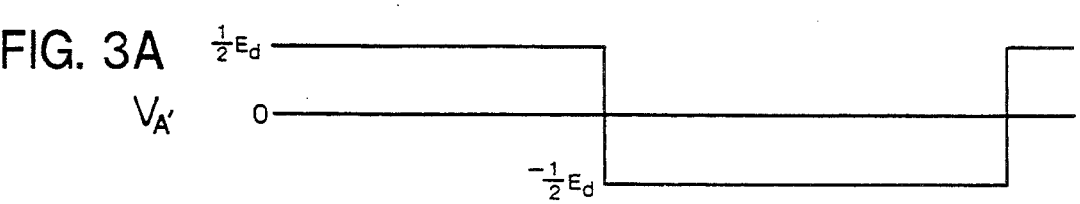
FIG. 3B $V_{B'}$
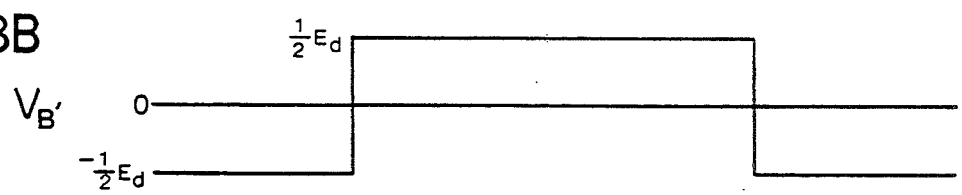
FIG. 3C $V_{C'}$
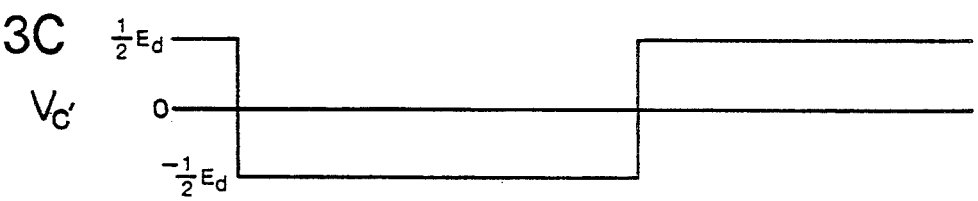
FIG. 3D $V_{A'N'}$
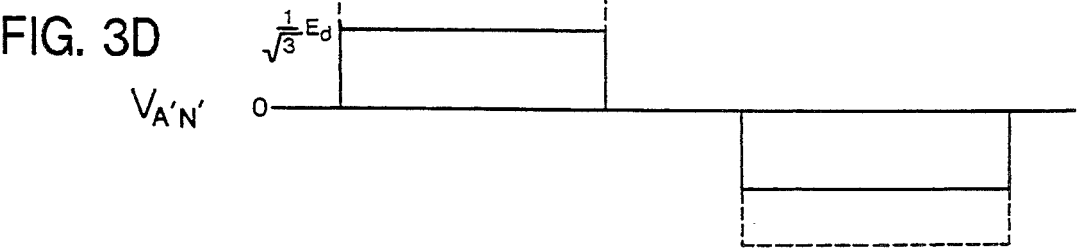

FIG. 3E
$N\phi_{A'N'}$
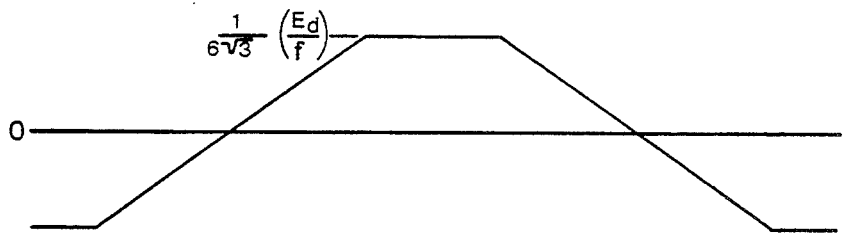
FIG. 4A
$V_{AN} + V_{A'N'}$
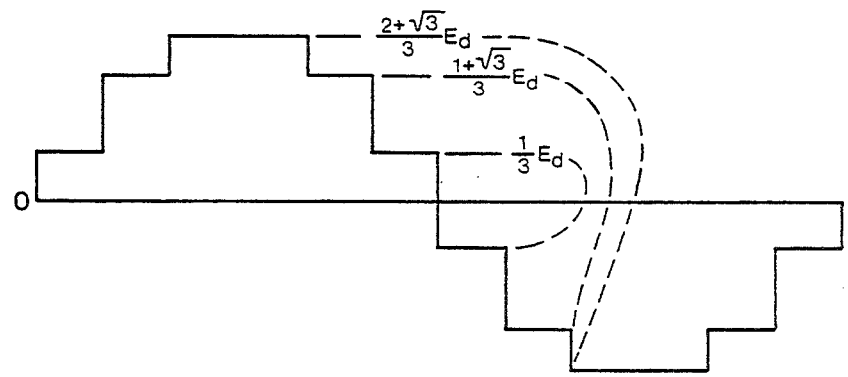
FIG. 4B
$N\phi_{AN} + N\phi_{A'N'}$
FIG. 4C
$V_{AN} - V_{A'N'}$
FIG. 4D
$N\phi_{AN} - N\phi_{A'N'}$

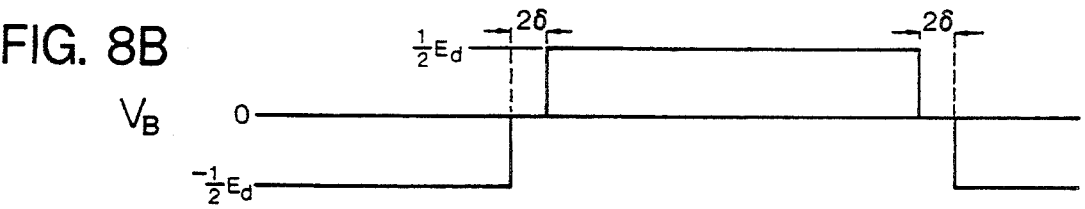
FIG. 8B $V_B$
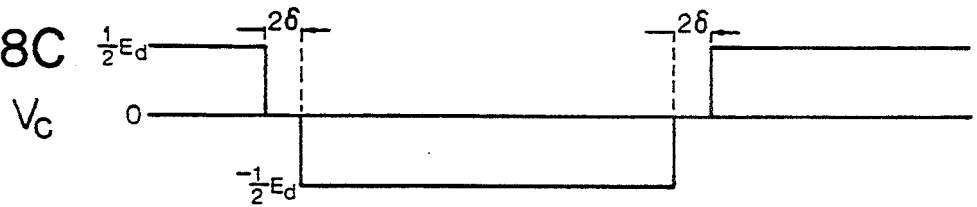
FIG. 8C $V_C$
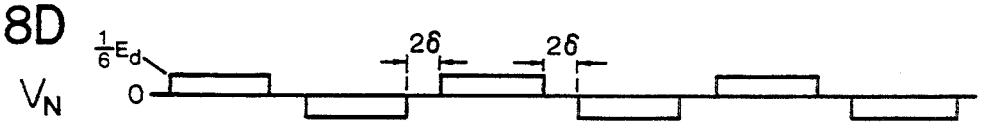
FIG. 8D $V_N$
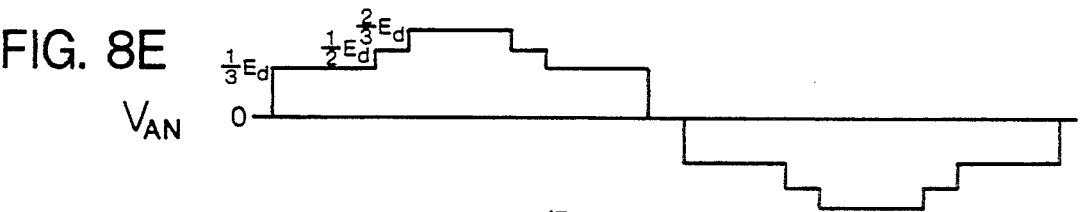
FIG. 8E $V_{AN}$
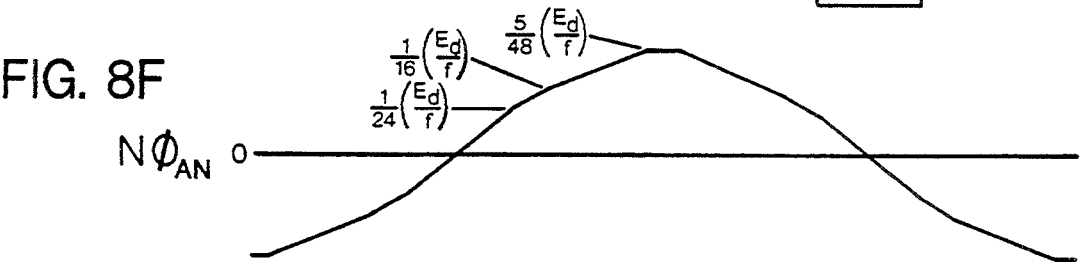
FIG. 8F $N\phi_{AN}$
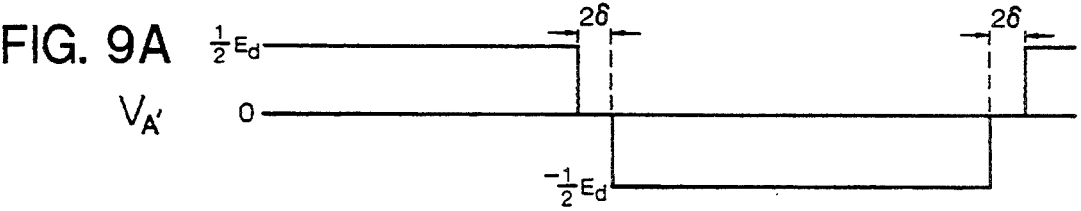
FIG. 9A $V_{A'}$
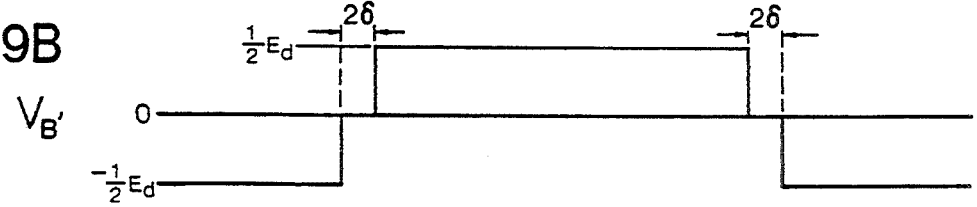
FIG. 9B $V_{B'}$

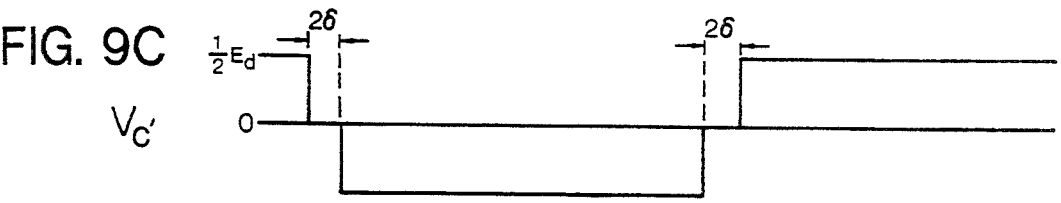
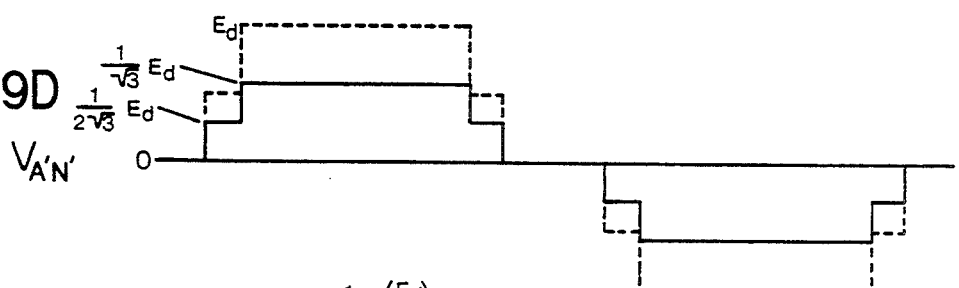
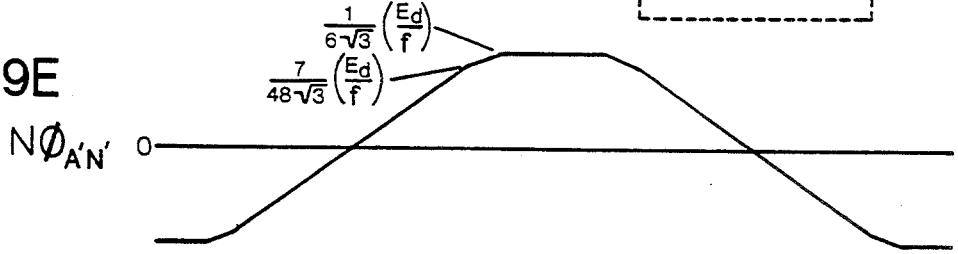
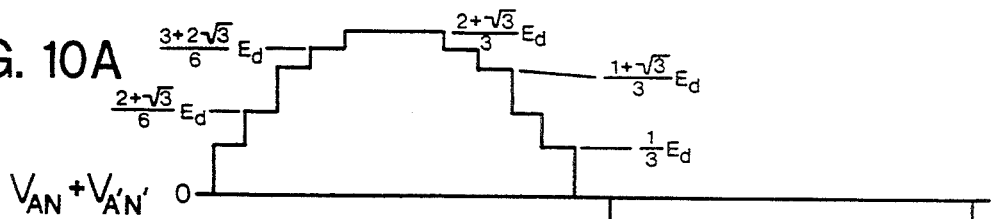
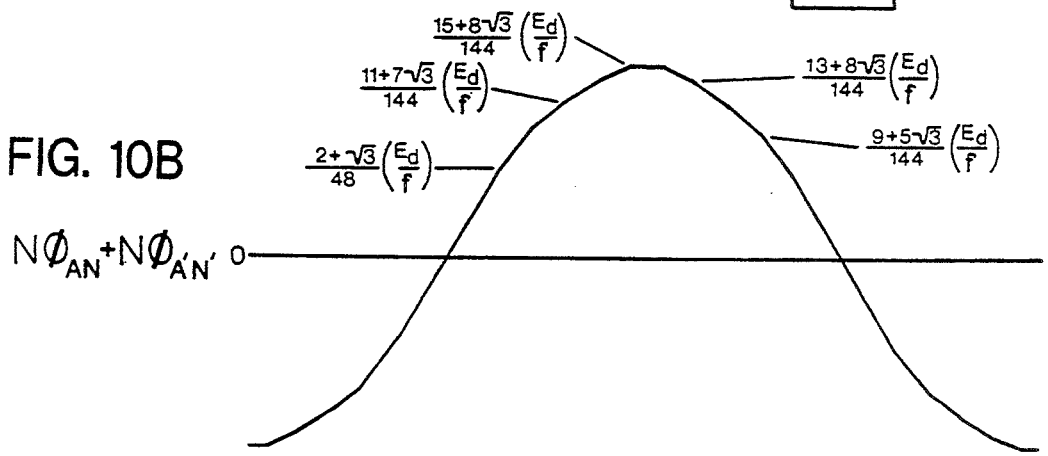

FIG. 10C
$V_{AN} - V_{A'N'}$
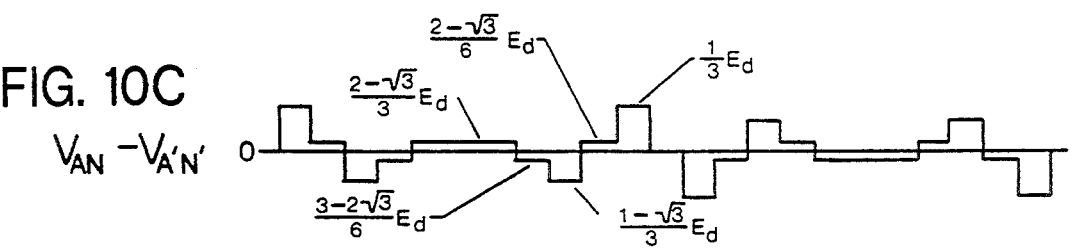
FIG. 10D
$N\phi_{AN} - N\phi_{A'N'}$
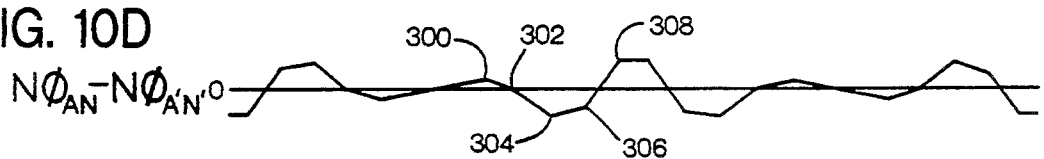
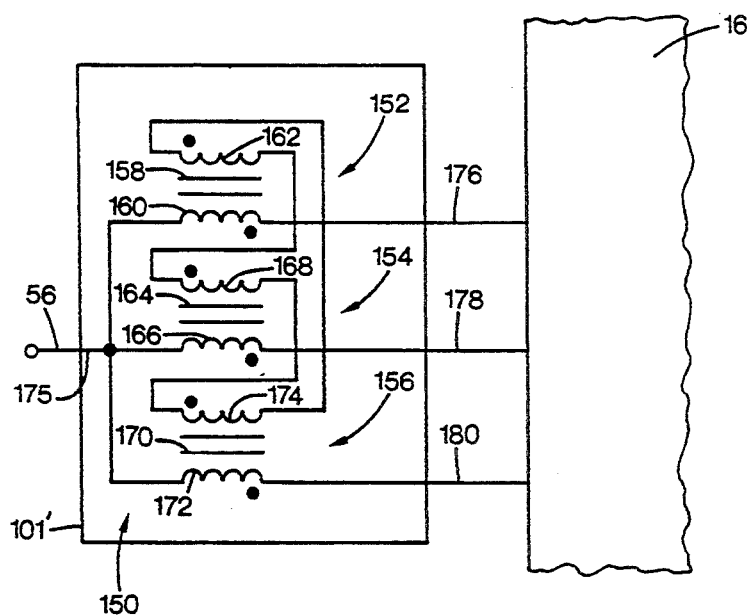
FIG. 11

HARMONIC BLOCKING CONVERTER SYSTEM

This is a continuation-in-part application of the U.S. patent application having Ser. No. 07/881,403, filed on May 11, 1992 now abandoned, and having the same inventor.

BACKGROUND OF THE INVENTION

The present invention relates generally to a converter systems, and more particularly to a converter system having a harmonic blocking transformer, including a main transformer coupled to a harmonic blocker, for use with conventional or enhanced converters, such as may be used in industrial or power systems applications to convert alternating current (AC) power into direct current (DC) power and vice versa, and more particularly for use in an advanced static VAR (volt-amperes-reactive) generator (ASVG). A method is also provided to reduce undesirable harmonic currents in a converter system for converting power between an AC source and a DC source.

In the past, three phase bridge rectifiers have been used to rectify three phase AC power into DC power. However, the rectified DC power has an undesirable ripple component. This ripple component is equal to six times the fundamental frequency of the AC power which was rectified. Some of this ripple may be eliminated using a three phase transformer having two sets of secondary windings each connected to a separate three phase bridge rectifier. By having one set of the secondary windings connected as a wye and the other connected in delta (referred to as wye/delta secondary windings), the resultant ripple produced by one rectifier is equal and opposite (180° out of phase) to that produced by the other rectifier.

For instance, if the AC line frequency is 60 Hertz (Hz), each rectifier produces 360 Hz ripple (6×60 Hz=360 Hz). The 30° phase shift provided by the wye/delta secondary winding connections places the ripple output of the rectifiers 180° out of phase. Since the two rectifiers are connected in series, the overall ripple produced is 720 Hz, and the device is referred to as a 12-pulse converter (12×60 Hz=720 Hz). The 720 Hz ripple is at a lower amplitude than that produced by each of the rectifiers separately, due to the equal and opposite nature of the ripple produced by the rectifiers in conjunction with the wye/delta transformer connections. This results in a smoother DC waveform, having less undesirable ripple. However, because the two rectifiers are connected in series, the DC voltage disadvantageously is twice that which would have been produced by one rectifier.

To rectify the AC power into DC power at a lower voltage using the same type of transformer having wye/delta secondary windings requires connecting the two rectifiers in parallel. However, the parallel connection of the rectifiers requires an interphase transformer to link together the rectifier outputs so their output voltages are identical. Once again, the resulting ripple produced by the two parallel rectifiers is at 720 Hz rather than 360 Hz, due to the wye/delta secondary winding connections of the transformer. Thus, with the rectifiers connected in parallel, not only is the ripple reduced, but a desired lower DC output voltage is also obtained.

A typical transformer arrangement for a 12-pulse voltage-source converter employs two magnetic structures in each phase. The windings from each of the two magnetic structures are connected in series on the AC line side. If the AC line is rated at a high voltage, this series connection is expensive due to higher electrical losses and the high voltage bushings required for each winding. Furthermore, the use of two separate magnetic structures is very expensive, both in terms of initial cost (materials, labor, etc.) and operating cost (e.g., hysteresis losses).

A conventional wye-wye/delta transformer (that is, a transformer having a wye primary winding connection and two sets of secondary windings, one connected as a wye and the other as a delta) is often used with a 12-pulse voltage-source converter. In this arrangement, circulating currents flow in the converter-side wye/delta windings at predominantly the fifth and seventh harmonics. These harmonic currents contribute to transformer losses and degrade the quality of the DC power produced. Some methods of reducing the undesirable fifth and seventh harmonic currents involve the staggered phasing of parallel inverter bridge legs using large and expensive interphase transformers. Other methods involve reducing these undesirable harmonics using 3-level controlled bridge legs. However, these methods are both ineffective and expensive uses of such harmonic controlling devices, which could be more efficiently used to reduce other harmonics, such as the eleventh and thirteenth harmonics.

In other systems, a voltage source inverter (VSI) may be used to couple a DC system, such as a battery, an uninterruptable power supply or a battery energy storage system, with an AC line source. Such a system requires independent control of the AC/DC voltage ratio to match the DC side of the VSI to the DC source and the AC side to the line. In this system, square waves are typically applied to the two ends of each inverter-side transformer winding. The AC/DC voltage ratio is controlled by adjusting the phase difference between these square waves to produce an adjustable width quasi-square wave across the winding. Harmonics are reduced by employing multiphase systems with zig-zag transformer connections on the line side. However, such a transformer arrangement is very complex, and only acceptable for relatively small low-voltage systems.

For static VAR generator applications, the DC side of an inverter is not necessarily tied to a fixed voltage source. Therefore, the DC voltage of the inverter can be controlled to regulate the VARs. The phase adjusting or phase-shift technique discussed above may be used as a relatively inexpensive method of harmonic reduction, such as in a quasi-harmonic neutralized inverter (QHNI). For example, the phase displacement may be set at a fixed angle or stagger, such as ±7.5°, to reduce the eleventh and thirteenth harmonics. However, the QHNI transformer disadvantageously requires a delta connection on the primary high volt (HV) line side. Furthermore, if the QHNI transformer is constructed as two three-phase units, the series connection on the line side disadvantageously requires six additional expensive high-voltage bushings, as well as extra winding insulation.

Another more conventional 12-pulse inverter may be used, but suffers the same disadvantages as the QHNI device if two three-phase transformers are employed. However, this conventional 12-pulse converter may be used without reducing harmonics by any phase-shift technique. Thus, access to both ends of each inverter-side winding is not required. Furthermore, the transformer delta connection may be moved to the inverter side, so that both windings on the line side are effectively connected in wye. This construction allows the transformers to be constructed as three single-phase units, with two cores housed in each tank so that the high-voltage series connections may be made internally within the tank. Thus, one additional single-phase unit may be purchased as a spare, to provide a more cost-effective and reliable system than one requiring the use of a single three-phase unit. In this configuration, only the usual three high-voltage bushings are required, as opposed to nine HV bushings with the QHNI device. Furthermore, a neutral point for grounding use is provided on the high voltage side of each single-phase unit.

This conventional 12-pulse inverter can use a transformer having three single-phase units which are either core-type transformers or shell-type transformers. Either type of transformer may be constructed with a common path for the 60 Hz fundamental flux in the windings combined with a small magnetic shunt for the fifth and seventh harmonic fluxes and their higher order components. This construction requires less iron than that required for two separate cores. Although multi-aperture cores have been used to provide harmonic flux paths in transformers for voltage-source inverters, such as in aerospace applications, larger sizes of multi-aperture cores are expensive and difficult to construct for utility applications.

SUMMARY OF THE INVENTION

According to one aspect of the present invention, a converter system is provided for converting power between an AC power source and a DC power source. The system includes a polyphase main transformer having primary and secondary windings. The primary windings are provided for coupling the converter system to the AC power source. The secondary windings include a wye winding set and a delta winding set. The system also includes a converter coupled to the secondary windings and to the DC power source for transferring power therebetween. The converter generates harmonic currents. The system also includes a polyphase harmonic blocker for blocking selected harmonics of the harmonic currents. The harmonic blocker has first and second blocking winding sets. The first and second blocking winding sets are magnetically coupled together for a subtractive flux therebetween. The first blocking winding set is coupled to the wye winding set of the main transformer for a subtractive current therebetween, whereas the second blocking winding set is coupled to the delta winding set of the main transformer for an additive current therebetween. In this manner, the harmonic blocker may substantially eliminate the selected harmonic currents, and particularly any undesirable fifth and seventh harmonic currents, generated by the converter from circulating in the wye and delta secondary windings of the main transformer.

According to another aspect of the present invention, a harmonic blocking transformer is also provided for coupling an AC power source to a converter for converting power between the AC power source and a DC power source.

According to yet another aspect of the present invention, a method is provided of reducing undesirable harmonic currents in a converter system for converting power between an AC power source and a DC power source.

In an illustrated embodiment, the converter has first and second converter sections each of which has an AC side and a DC side. The converter may be constructed for 2-level control or 3-level control.

An overall object of the present invention is to provide a converter system for converting power between a DC source and an AC source.

An additional object of the present invention is to eliminate the need for special multi-aperture cores in transformers for such converter systems.

A further object of the present invention is to provide a harmonic blocking interphase transformer for use with a conventional converter and a delta-wye/delta or wye-wye/delta transformer which suppresses harmonic circulating currents in the converter-side wye/delta windings.

Yet another object of the present invention is to provide an interphase transformer system which is small, relatively inexpensive, and eliminates the need for other expensive methods of reducing the fifth and seventh harmonics.

Still another object of the present invention is to provide an improved converter system which is economical to operate in industrial and utility applications.

Another object of the present invention is to provide an improved harmonic blocking transformer for coupling an AC line source with a converter.

Yet another object of the present invention is to provide an improved method of reducing undesirable harmonic currents in a converter system.

BRIEF DESCRIPTION OF THE DRAWINGS

FIGS. 1A and 1B are schematic block diagrams of one form of a converter system of the present invention including a harmonic blocking transformer and a converter for transferring power between an AC source and a DC source.

FIGS. 2A–2F are graphs illustrating the waveforms of the wye secondary windings of the harmonic blocking transformer of FIGS. 1A and 1B.

FIGS. 3A–3E are graphs illustrating the waveforms of the delta secondary windings of the harmonic blocking transformer of FIGS. 1A and 1B.

FIGS. 4A–4D are graphs of the waveforms for phase "A" of the converter system shown FIGS. 1A and 1B.

FIGS. 8A–8F are graphs illustrating the waveforms associated with the wye secondary windings of the harmonic blocking transformer shown in FIGS. 1A and 1B using stagger-phasing provided by a converter having 3-level control, as shown in FIGS. 7A–7F.

FIGS. 9A–9E are graphs illustrating the waveforms associated with the delta secondary windings of the harmonic blocking transformer shown in FIGS. 1A and 1B using stagger-phasing provided by a converter having 3-level control, as shown in FIG. 7A–7F.

FIGS. 10A–10D are graphs of the waveforms for phase "A" of the system shown FIGS. 1A and 1B using stagger-phasing provided by a converter having 3-level control, as shown in FIG. 7A–7F, to provide quasi-24-pulse harmonic neutralization.

FIG. 11 is a schematic diagram of a single phase of an alternate waveform enhancer having plural interphase transformers arranged to form multiple parallel phase legs.

DETAILED DESCRIPTION OF THE PREFERRED EMBODIMENTS

Figure 1B:
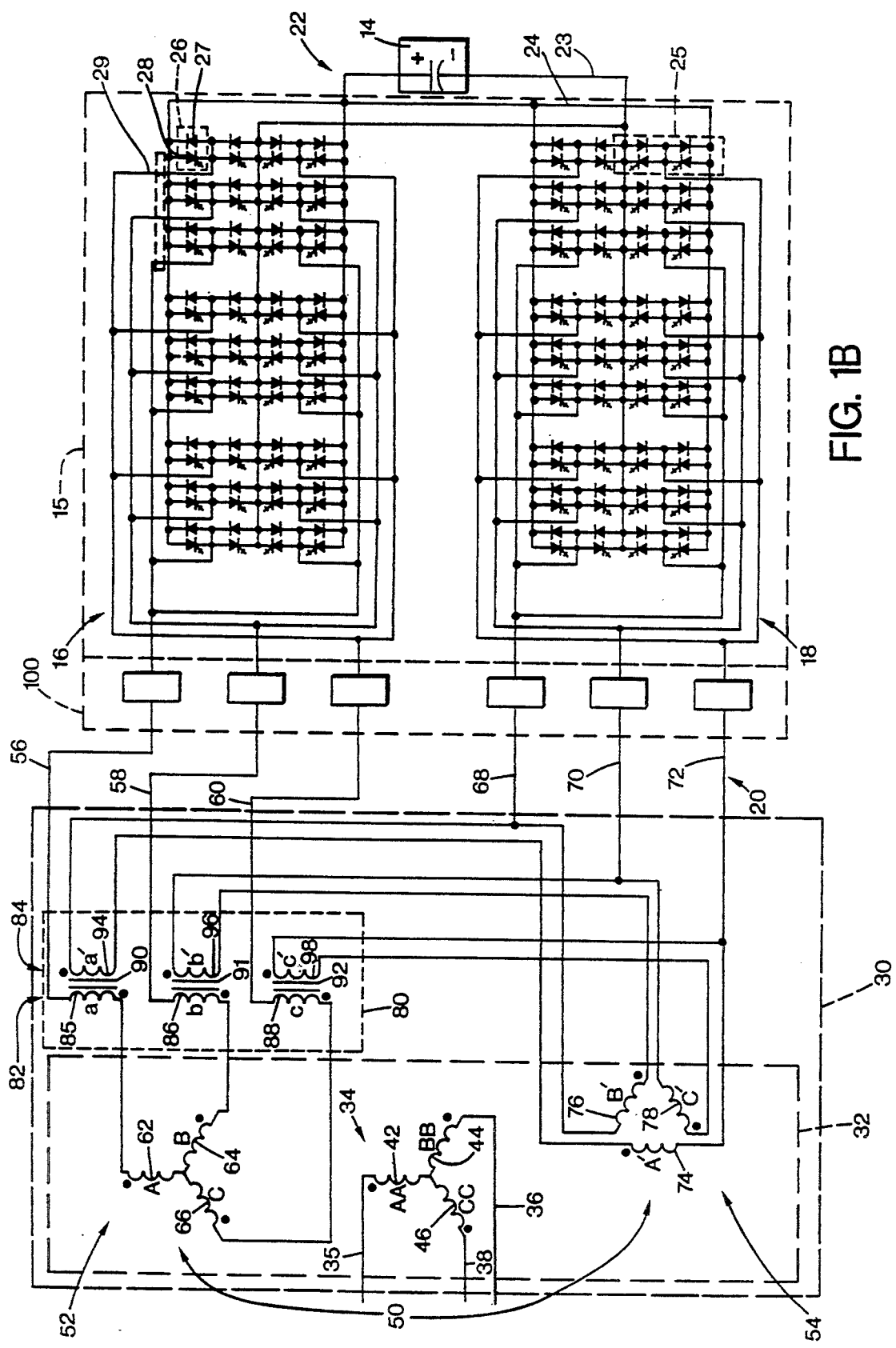

Referring to FIGS. 1A and 1B, two illustrated embodiments of a converter system 12 constructed in accordance with the present invention are shown for converting AC and DC power between an AC power source 13 and a DC power source 14. The AC source 13 may be a line source, such as a utility system, and the DC source 14 may be a battery bank, or the like, and is illustrated as a capacitor. As shown in FIG. 1B, a converter 15 has two converter sections 16 and 18, such as mutually phase displaced six pulse converters which may be either voltage source converters or inverter bridges. If desired for a particular application the converter sections 16 and 18 comprising converter 15' may alternatively be separate, discrete components, as shown in FIG. 1A. Functionally, the converters 15 and 15' operate in a substantially identical manner, and the numerals 15, 16 and 18 are used herein to describe the operation of both converters, unless otherwise noted.

Each converter section 16, 18 has an AC side 20 and a DC side 22. A negative DC bus 23 and a positive DC bus 24 couple the DC sides 22 of bridges 16 and 18 to the DC source 14. In the illustrated embodiment, the bridge 18 is phase displaced in time 30° ahead of bridge 16, as indicated by the symbol <0° for bridge 16, and by the symbol <30° for bridge 18. Such a converter 15, as well as the converter sections 16 and 18, are well-known by those skilled in the art and may be constructed using known combinations of diodes and controllable switching devices, such as transistors, SCRs (silicon controlled rectifiers), GTOs (gate turn-off thyristors), and the like.

For example, the converter 15 illustrated in FIG. 1B includes a plurality of converter arms, such as converter arm 25, in a three phase bridge arrangement capable of 2-level control. Each converter arm 25 has a plurality of thyristor-diode sets 26 each comprising a diode 27 coupled in antiparallel relation to a GTO (gate turn-off thyristor) 28. Each thyristor-diode set 26 couples either the negative DC bus 23 or the positive DC bus 24 with a union, junction, which may include a terminal and/or conductor, such as conductor 29.

A harmonic blocking transformer 30 couples the AC line source 13 to the parallel bridges 16 and 18. The harmonic blocking transformer 30 includes a conventional transformer, such as a three-phase main transformer 32 having primary windings 34 coupled with the AC source 13 by conductors 35, 36 and 38. In the illustrated embodiments, the primary windings 34 are connected in wye at a neutral point 40, although it is apparent that the primary windings may also be connected in delta if desired for a particular application. The primary windings 34 include a first winding 42, labeled phase AA between conductor 35 and neutral point 40, a second winding 44, labeled phase BB between conductor 36 and neutral point 40, and a third winding 46 labeled phase CC between conductor 38 and neutral point 40.

The main transformer 32 has secondary windings 50 magnetically coupled with the primary windings 34 and including a first set of windings 52 connected in wye, and a second set of windings 54 connected in delta. The wye windings 52 are coupled by conductors 56, 58 and 60 to the AC side 20 of bridge 16, and connected in wye at a neutral point N. The wye windings 52 include a first winding 62 labeled A, between conductor 56 and the neutral point N; a second winding labeled phase B, between conductor 58 and the neutral point N; and a third winding labeled phase C, between conductor 60 and neutral point N.

The delta windings 54 are coupled by conductors 68, 70 and 72 to the AC side 20 of bridge 18. In the illustrated delta connection, windings 54 include a first winding 74 labeled phase A' between conductors 68 and 72; a second winding 76 labeled phase B' between conductors 68 and 70; and a third winding 78 labeled phase C' between conductors 70 and 72. The phases of the secondary wye and delta windings 52, 54 are magnetically coupled in conventional phase relationship with the respective phase windings of the primary windings 34. For example, the primary winding 42 for a series of large unnumbered dots are also shown on FIGS. 1A and 1B, with one dot being located adjacent one end of each transformer winding or coil. Each dot is located according to ordinary dot convention to indicate whether the coils are wound to produce additive or subtractive fluxes. That is, the dots are placed at one terminal of each coil such that the currents entering the dot-marked terminals produce additive fluxes. Of course, the same result occurs if both currents leave the dot-marked terminals. However, if neither of these conditions occur, then subtractive fluxes result and the sign of the mutual voltage at each coil is opposite the sign of the self-induced voltage at that same coil. In both the primary windings 34 and the secondary wye windings 52 of the main transformer, the polarity dots for each phase are located at the end of the phase windings opposite from the neutral points 40, N. In the secondary delta windings 54, for the phase A' winding 74, the dot is located at the winding end coupled with conductor 68, for winding 76 the dot is located at the winding end coupled to conductor 70, and for winding 78, the dot is located toward the end coupled with conductor 72.

The system 12 also includes a polyphase harmonic blocker, illustrated as a three phase harmonic blocker 80, for blocking selected harmonics of the harmonic currents generated by the converter 15. The harmonic blocker 80 has first and second blocking winding or coil sets 82 and 84 which are oppositely polarized, that is, for each phase the first and second blocking coils are magnetically coupled together for a subtractive flux therebetween. While the terms coil and winding are understood to be interchangeable, for clarity, the term "coil" is used herein to refer to the structure of the harmonic blocker 80. For convenience, occasionally the term "winding" is used herein to refer to the harmonic blocker coils, particularly when referring to them in conjunction with the main transformer windings.

The first set of blocking coils 82 includes a first coil 85 labeled phase a, a second coil 86 labeled phase b, and a third coil 88 labeled phase c. In the illustrated embodiment, the blocking coils 82 are coupled in series with the respective or associated phases of the main transformer secondary wye windings 52 to provide a subtractive current therebetween, as indicated by the conventional dot notation in FIG. 1A. The larger dots described above correspond to the main transformer secondary windings 50. Similarly, in a conventional manner, the smaller dots correspond to the coils of the harmonic blocker 80. Specifically, the phase a coil 85 and the phase A winding 62 are in series, the phase b coil 86 and the phase B winding 64 are in series, and the phase c coil 88 is in series with the phase C winding 66.

As best shown in FIG. 1B, harmonic blocker 80 includes three blocking magnetic cores 90, 91 and 92. The cores 90, 91 and 92 may be configured as three separate magnetic structures, or each core may be one leg of a three-legged magnetic structure. The harmonic blocking transformer 30 also has three cores for each phase of the main transformer 32, but for clarity, the main transformer core structure has been omitted from FIGS. 1A and 1B. To magnetically link together the main transformer primary and secondary windings 34 and 50, the phase AA winding 42 is wound on a first core with the phase A winding 62 and the phase A' winding 74, the phase BB winding 44 is wound on a second core with the phase B winding 64 and the phase B' winding 76, and the phase CC winding 46 is wound on a third core with the phase C winding 66 and the phase C' winding 78.

The second set of blocking coils 84 includes a first coil 94 labeled phase a', a second coil 96 labeled phase b', and a third coil 98 labeled phase c'. In the illustrated embodiment, the blocking coils 84 are coupled in series with the respective or associated phases of the main transformer secondary delta windings 54 to provide an additive current therebetween as indicated by the conventional dot notation mentioned above. Specifically, the phase a' coil 94 and the phase A' winding 74 are in series, the phase b' coil 96 and the phase B' winding 76 are in series, and the phase c' coil 98 is in series with the phase C' winding 78.

The first and second blocking coils 82 and 84 are magnetically linked by the blocking cores 90, 91 and 92. Specifically, the phase a and a' coils 85 and 94 both wound around core 90, the phase b and b' coils 86 and 96 are wound around core 91, and the phase c and c' coils 88 and 98 are wound around core 92. The harmonic blocker coils are wound about their respective cores to provide a subtractive flux for each phase between the first and second coils 82 and 84. In this manner, by winding the harmonic blocker coils to provide these subtractive fluxes, any fundamental current component flowing through the coils will cancel out the fundamental flux component in the blocking cores 90, 91, 92, desirably causing no blocking effect for the fundamental frequency (e.g., 60 Hz line frequency in the United States, and 50 Hz in Europe).

Alternatively, the blocking coils 82 may be coupled in series with the respective or associated phases of the main transformer secondary wye windings 52 to provide an additive current therebetween (not shown). For this alternative embodiment, the blocking coils 84 may be coupled in series with the respective or associated phases of the main transformer secondary delta windings 54 to provide a subtractive current therebetween (not shown). In this alternate embodiment, each phase of the harmonic blocking coils are still wound about their respective cores with opposite polarities to provide a subtractive flux between the first and second coil sets 82 and 84.

This oppositely polarized winding configuration of the harmonic blocker, combined with the series interconnection of the blocking coils 82, 84 and the main transformer secondary windings 52, 54, allows the harmonic blocker 80 to suppress the undesirable effects of any fifth and seventh harmonic currents flowing through the main transformer secondary windings 50. The manner of accomplishing this harmonic-blocking effect will be described in greater detail below with reference to FIGS. 2A–2F, 3A–3E and 4A–4D. By using the harmonic blocker 80 as described herein in conjunction with a fully conventional transformer, such as the wye-wye/delta transformer 32, the need for special multi-aperture cores as described in the background section above, can advantageously be avoided.

It is apparent that the harmonic blocking transformer 30 may be constructed as a plurality of single phase units. For example, each phase of the main transformer may be housed in a separate tank, and each phase of the harmonic blocker may be housed in a separate tank. In this example, each of the interconnections between the windings of the main transformer 32 and the harmonic blocker 80 are made externally to the tanks. Alternatively, the harmonic blocking transformer 30 may be constructed as two separate three phase units, with one unit comprising the main transformer 32 housed in a first tank, and the second unit comprising the harmonic blocker 80 housed in a second tank. As another alternative, the harmonic blocking transformer 30 may be supplied as a single unit, with both the main transformer 32 and the harmonic blocker 80 supplied as single three phase units each housed within a common tank. Such an embodiment may be particularly useful in industrial applications where the converter system 12 may be sold as a packaged unit.

As a fourth alternative, all of the windings for a single phase for the main transformer 32 and the harmonic blocker 80 may be housed within a single tank. Thus, the harmonic blocking transformer 30 would include three tanks, with one tank for all the phase "A" windings, one for all of the phase "B" windings, and one for all of the phase "C" windings. For example, a single tank housing the "A" phase would enclose the phase AA primary winding 42, the phase A and phase A' main transformer secondary windings 62 and 74, and the phase a and a' coils 85 and 94, which would, of course, include the blocking core 90 and the phase "A" core of the main transformer (not shown). This embodiment may be particularly useful in high power utility applications, where a single phase harmonic blocking transformer tank could be kept on hand as a spare should one of the other single phase tanks fail. It is apparent that other configurations based on a combination of the above are also possible, such as a three phase harmonic blocker 80 housed within a single tank combined with a main transformer 30 comprised of three banked single phase units.

Due to the delta/wye configuration of the secondary windings 50, each phase of the wye windings 52 has a $1:\sqrt{3}$ turns ratio with respect to each phase of the delta windings 54. The turns ratio of harmonic blocker coils 82 and 84 may also have the same turns ratio as the main transformer secondary windings, that is $1:\sqrt{3}$. This construction differs from conventional interphase transformers which have a single center-tapped winding. Here, the coils of harmonic blocker 80 are separated and each coil is coupled with a single phase of the main transformer secondary windings 50. Furthermore, the coils of the harmonic blocker 80 may have unequal turns.

The operation of the converter system 12 is illustrated with reference to a twelve pulse voltage source converter 15, with the resulting voltage and flux linkage waveforms shown in FIGS. 2A–4D. The six pulse <0° bridge 16 feeding the wye windings 52 and 82 generates the waveforms shown in FIGS. 2A–2F. The six pulse <30° bridge 18 feeding the delta windings 54 and 84 produces the waveforms shown in FIGS. 3A–3E. For a proper comparison of the delta and wye values in FIGS. 2A–3E, the resultant transformer voltage and flux are referred to an equivalent wye system, such as the primary windings on the line side of the AC source 13.

A typical six pulse bridge operates at a frequency of 360 hertz, that is, it cycles six times during the span of a single 60 hertz cycle. A single cycle of bridge 16 is shown in FIG. 2A as the voltage waveform $V_A$ supplied via conductor 56 to the phase A and phase a windings 62, 85. The peak-to-peak voltage of $V_A$ is $E_d$, such that the maximum value is $\frac{1}{2}E_d$. Similarly FIG. 2B shows the voltage waveform $V_B$ applied by bridge 16 via conductor 58 to the phase B and b windings 64, 86. The phase C voltage waveform $V_C$, shown in FIG. 2C, is applied by bridge 16 through conductor 60 to the phase C and c windings 66, 88. Note the amplitude of each of the waveforms $V_B$ and $V_C$ are the same as that described above for waveform $V_A$. However, the waveforms $V_A$, $V_B$ and $V_C$ are each phase displaced or shifted from each other by 120° as shown by comparing the waveforms of FIGS. 2A, 2B and 2C.

The voltage at the neutral point N of the wye windings 52 is shown in FIG. 2D as waveform $V_N$. The peak-to-peak voltage of the waveform $V_N$ is $E_d/3$, with a peak value of $E_d/6$, which is the average value of the waveforms $V_A$, $V_B$ and $V_C$ (i.e., $[V_A+V_B+V_C] \div [3]$). Thus, the phase voltage, for example, across phase "A" of the wye windings 52 is represented in FIG. 2E as waveform $V_{AN}$. The waveform $V_{AN}$ is the difference between the voltage $V_A$ shown in FIG. 2A, and the neutral voltage $V_N$ shown in FIG. 2D. It is apparent that similar waveforms exist for the "B" and "C" phases.

Referring to FIG. 3A, a single cycle of the <30° bridge 18 is shown as voltage $V_{A'}$ supplied via conductor 68 to the dot end of the phase A' and a' windings 74, 94. Note that the peak-to-peak voltage of $V_{A'}$ is $E_d$, such that the maximum value is $\frac{1}{2}E_d$. Similarly, FIG. 3B shows the voltage waveform $V_{B'}$ which is applied by bridge 18 via conductor 70 to the dot end of the phase B' and b' coils 76, 96. The phase "C" voltage waveform $V_{C'}$, shown in FIG. 3C, is applied by bridge 18 through conductor 72 to the dot end of the phase C' and c' coils 78, 98. The amplitude of waveforms $V_{B'}$ and $V_{C'}$ is the same as the waveform $V_{A'}$ amplitude. However, the waveforms $V_{A'}$, $V_{B'}$ and $V_{C'}$ are each phase displaced or shifted from each other by 120° as shown by comparing the waveforms of FIGS. 3A, 3B and 3C. Due to the 30° phase difference between bridges 16 and 18, the voltage waveforms of FIGS. 3A–3C are shifted 30° in time ahead of the voltage waveforms in FIGS. 2A–2C.

FIG. 3D illustrates the phase voltage waveform $V_{A'N}$ for the delta connected phase "A" windings 74 and 94 coupled to bridge 18. The neutral value results from referring the delta secondary winding values to an equivalent wye system. The peak-to-peak value of waveform $V_{A'N}$ is $2E_d/\sqrt{3}$, with a peak value of $E_d/\sqrt{3}$. The dashed waveform in FIG. 3D with a peak value $E_d$ is the difference of the $V_{A'}$ waveform in FIG. 3A and the $V_{C'}$ waveform in FIG. 3C. This dashed waveform of FIG. 3D appears across the delta windings 74 and 94, and becomes $V_{A'N}$ when referred to the equivalent wye system to obtain values on the same basis as the wye windings 52 and 82. It is apparent that similar waveforms exist for the "B" and "C" phases of windings 54 and 84.

The flux linkage waveforms shown in FIGS. 2F and 3E have a similar shape and are proportional to the current in a pure inductive load fed by the respective bridges 16, 18, that is, $N\phi = Li$. For example, assuming the voltage of DC source 14 was supported by a battery, these flux linkage waveforms have the shape of the current that would be fed by an advanced static VAR generator (ASVG) into a short-circuited (faulted) AC system, such as the AC line source 13. In normal operation, the fundamental component of this fault current is opposed by a sinusoidal fault current that would be delivered by the AC system 13 into a short-circuited converter. The difference between these fault currents may be determined by the difference in the fundamental voltages. This difference between the fault currents is the normal operating current of the converter system 12.

In this analysis, the bridges 16 and 18 are assumed to be the only source of harmonic voltages. Thus, the harmonic content of the current of system 12 is determined by the converter 15 and is proportional to the voltage of DC source 14. The DC voltage of source 14 varies over a relatively small range as the reactive power (VAR) of the load changes, with such a range being on the order of 75–100% of the rated DC voltage of source 14.

The peak flux linkages required by a conventional transformer fed by a sine-wave voltage having a peak value of $V_m$ are given by the equation:

$$N\Phi_m = \frac{V_m}{\omega}$$

The relative flux requirements of stepped-wave transformers may be compared to this standard by expressing the value of $N\Phi_m$ in terms of the peak fundamental voltage generated by the converter. For the six pulse converter bridges 16 and 18, the fundamental voltage is the same as for a basic square wave, that is, $V_m = 2E_d/\pi$. Therefore, by setting $\omega = 2\pi f$, this may be expressed as:

$$\frac{E_d}{f} = \frac{\pi}{2} V_m \frac{2\pi}{\omega} = \pi^2 \frac{V_m}{\omega}$$

For a single-phase square wave transformer, the flux linkage is written as:

$$N\Phi_m = \frac{1}{8} \frac{E_d}{f} = \frac{\pi^2}{8} \frac{V_m}{\omega} = 1.234 \frac{V_m}{\omega}$$

For the six pulse wye-connected transformer windings and 82, the flux linkage equation becomes:

$$N\Phi_m = \frac{1}{9} \frac{E_d}{f} = \frac{\pi^2}{9} \frac{V_m}{\omega} = 1.0966 \frac{V_m}{\omega}$$

The graph of this relationship for phase "A" is shown in FIG. 2F as waveform $N\Phi_{AN}$. For the six pulse delta-connected transformer windings 54 and 84, the flux linkage equation becomes:

$$N\Phi_m = \frac{1}{6\sqrt{3}} \frac{E_d}{f} = \frac{\pi^2}{6\sqrt{3}} \frac{V_m}{\omega} = 0.9497 \frac{V_m}{\omega}$$

The flux linkage waveform according to this equation is given in FIG. 3E for waveform $N\Phi_{A'N'}$. From examining these last two equations, it is apparent that the wye windings 52 and 82 require approximately 10% more, and the delta windings 54 and 84 require approximately 5% less, flux linkage than a pure sine-wave transformer.

FIG. 4A illustrates the sum of the voltage waveform $V_{AN}$ of FIG. 2E, and waveform $V_{A'N'}$ of FIG. 3D. FIG. 4B shows the waveform of the sum of the flux linkage waveforms $N\Phi_{AN}$ of FIG. 2F and $N\Phi_{A'N'}$ of FIG. 3E. FIG. 4C shows the difference of the voltage waveform $V_{AN}$ less the waveform $V_{A'N'}$. FIG. 4D shows the flux linkage waveform which is the difference between waveform $N\Phi_{AN}$ less the waveform $N\Phi_{A'N'}$.

The resulting twelve pulse voltage waveform shown in FIG. 4A appears across the AC line source 13 and across all the main transformer windings 34, 52 and 54. The earlier systems, described in the background portion above, experience unbalanced fluxes in their separate transformer components. However, the main flux in the harmonic transformer 30 is a true twelve pulse waveform, as shown in FIGS. 4A–4D. Since the fundamental voltage of the effective series combination of the wye windings 52, 82 and the delta windings 54, 84 (referred to the wye equivalent) is $V_m = 4E_d/\pi$, therefore:

$$N\Phi_m = \frac{2+\sqrt{3}}{18} \frac{E_d}{f} =$$

$$\frac{(2+\sqrt{3})\pi^2}{36} \frac{V_m}{\omega} = 1.0232 \frac{V_m}{\omega}$$

As shown from the equation immediately above, the required flux linkage is only 2.3% higher than for a sine-wave transformer.

The current $I_G$ in a single converter arm, such as arm 25 (see FIG. 1B), at the time of switching in a twelve pulse ASVG is:

$$I_G = 1.0232 \frac{V_m}{\omega L} - \frac{E_m}{\omega L}$$

where $E_m$ is the peak AC system voltage and L is the leakage inductance of the main transformer 32. The peak fundamental component of current $I_m$ is given by:

$$I_m = \frac{V_m - E_m}{\omega L}$$

so, $$I_G = 1.0232 \left( I_m + \frac{E_m}{\omega L} \right) - \frac{E_m}{\omega L}$$

and

-continued $$\frac{I_G}{I_m} = 1.0232 + 0.0232 \frac{E_m}{\omega L I_m}.$$

At rated loads supplying the reactive power (VARs), $I_m = +\sqrt{2}$pu. Therefore, $$I_{Gpu} = \sqrt{2}\left(1.0232 + \frac{0.0232}{X_{pu}}\right) = (\sqrt{2})(1.178)$$

for $X_{pu} = 0.15$, which must, of course, be turned off by a gate turn-off thyristor (GTO), such as GTO 28 in FIG. 1B.

At rated load while absorbing reactive power (VARs), the peak fundamental component current is given as $I_m = -\sqrt{2}$ pu. Therefore, $$I_{Gpu} = -\sqrt{2}\left(1.0232 - \frac{0.0232}{X_{pu}}\right) = (-\sqrt{2})(0.869)$$

for $X_{pu} = 0.15$, which is initially in a diode and which must be switched into the GTO when it turns on, such as diode 27 and GTO 28 in FIG. 1B.

The voltage difference $(V_{AN}-V_{A'N'})$ shown in FIG. 4C appears across the harmonic blocker 80 of FIG. 1. The flux difference $(\Phi_{AN}-N\Phi_{A'N'})$ of FIG. 4D also appears across the harmonic blocker 80. As discussed in the background portion above, earlier units disadvantageously required that the transformer cores be constructed with special magnetic shunts to accommodate this flux. Such magnetic shunts are clearly not required when the harmonic blocker 80 is used as described herein.

The peak flux linkage across one coil of the harmonic blocker 80 is half the difference indicated in FIG. 4D, such that:

$$N\Phi_m = \frac{1}{2}\left(\frac{1}{9} - \frac{1}{6\sqrt{3}}\right)\frac{E_d}{f} =$$

$$\left(\frac{1}{9} - \frac{1}{6\sqrt{3}}\right)\frac{\pi^2}{4} \frac{V_m}{\omega} = 0.0367 \frac{V_m}{\omega}$$

Thus, the rating of the harmonic blocker 80 is 3.67% of the rating of the main transformer 32.

Without the harmonic blocker 80, the voltage difference shown in FIG. 4C would drive a circulating current between the main transformer secondary wye and delta windings 52 and 54. This circulating current would have the same flux linkage difference waveform as shown in FIG. 4D. Such a circulating current would be limited only by the leakage inductance between windings 52 and 54. In this scenario, the transformer leakage inductance may be assumed to be split equally between the main transformer primary and secondary windings 34 and 50. Thus, 0.5 pu of the leakage inductance is associated with the primary windings 34, and 1.0 pu is associated with each of the wye and delta windings 52, 54 since they are effectively in parallel with the two secondary windings each contributing half of the current to the primary windings 34. With this assumption, the peak circulating current $I_c$ (which is to be distinguished from any phase "C" current) is:

$$I_c = 0.0367 \frac{V_m}{\omega L}$$

and the peak current in a GTO is increased to:

$$I_G{'} = I_G + I_c = 1.0599 \frac{V_m}{\omega L} - \frac{E_m}{\omega L}$$

so $$I_{Gpu}{'} = \sqrt{2} \left( 1.0599 + \frac{0.0599}{X_{pu}} \right) = (\sqrt{2})(1.4592)$$

for $X_{pu}=0.15$, which is a 24% increase over $I_{Gpu}$, the turn-off rating of the GTO, such as GTO 28. Such a circulating current will also disadvantageously cause extra $I^2R$ heating losses during all conditions of operation.

Thus, use of the harmonic blocker 80 provides a variety of design and performance benefits. The operation of the converter system 12 may be enhanced by including a waveform enhancer for substantially blocking additional selected harmonics of the harmonic currents generated by the converter 15. The waveform enhancer may comprise interphase transformers, or center-tapped transformers using stagger phasing. The waveform enhancer may be separate from the converter as shown in FIGS. 1A and 1B, or incorporated partially or completely therein. The operation of the converter system 12 may also be enhanced by using a converter constructed for 3-level control, rather than the 2-level control converter 15 discussed above. The 3-level controlled converter also substantially blocks additional selected harmonics of the harmonic currents generated by the converter 15. Each of these performance enhancement techniques are discussed below.

Stagger Phasing Embodiment

Referring to FIG. 1A, the converter system 12 includes a waveform enhancer 100 coupling the converter 15 to the harmonic blocking transformer 30. The waveform enhancer 100 has six single phase enhancer segments, with segments 101, 102 and 103 each coupling a single phase of the wye windings 52, 82 with converter section 16, and segments 104, 105 and 106 coupling the delta windings 54, 84 with converter section 18. The waveform enhancer 100 employs a quasi-harmonic neutralization technique using interphase transformers with staggered phasing to greatly reduce, although not entirely eliminate, selected pairs of undesirable harmonic currents.

Figure 5:
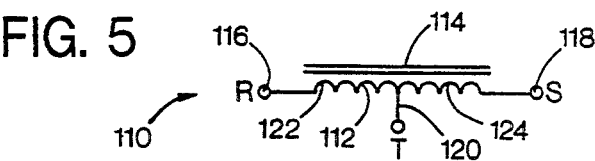
FIG. 5 is a schematic diagram of one form of a single phase of a waveform enhancer of the present invention comprising a center-tapped interphase transformer for use with a stagger-phasing converter.

Each of the enhancer segments 101–106 has at least one interphase transformer, such as a center-tapped interphase transformer 110 as shown in FIG. 5. The center-tapped interphase transformer has a winding 112 wound on core 114 and extending between terminals 116 and 118. A center tap 120 separates the winding 112 into a first portion 122 extending between the center tap 120 and terminal 116, and a second portion 124 between the center tap 120 and terminal 118. Each of the interphase transformers 110 of enhancer segments 101–106 may be coupled to the converter 15 and harmonic blocking transformer 30 in the same manner. For example, enhancer segment 105 in FIG. 1A is coupled in a conventional manner to the <30° converter section 18 by conductors 126 and 128. Within the enhancer segment 105, the terminals 116 and 118 of the interphase transformer 110 are coupled to the respective conductors 126 and 128. The center tap 120 is coupled to the harmonic blocking transformer 30 by conductor 70.

Figure 6A:
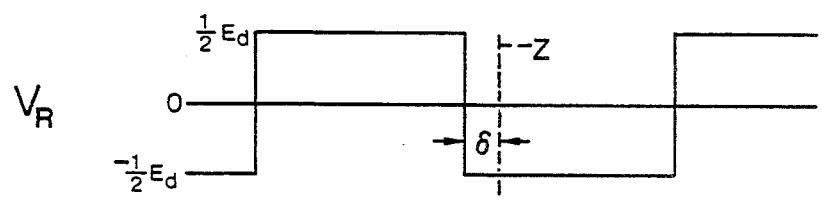
FIGS. 6A–6E are graphs of the waveforms associated with the waveform enhancer of FIG. 5.
Figure 6B:
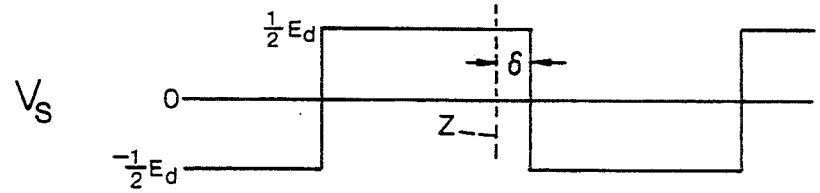
Figure 6C:
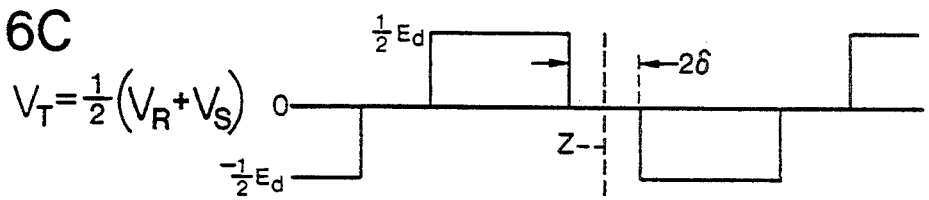
Figure 6D:
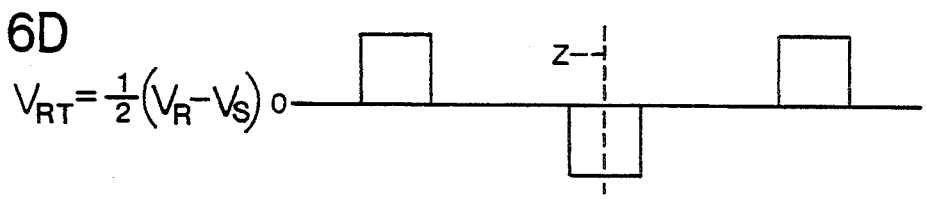

FIGS. 6A–6D illustrate the typical voltage waveforms of the center-tapped interphase transformers 110 of enhancer segments 101–106. In FIG. 6A, the voltage waveform $V_R$ supplied by the converter 15 has a peak-to-peak voltage $E_d$, with a peak value of $\frac{1}{2}E_d$. In FIG. 6B, the voltage waveform $V_S$ supplied by the converter 15 has the same amplitude as waveform $V_R$ of FIG. 6A. The waveforms $V_R$ and $V_S$ are staggered in time by a selected phase angle $\delta$ about a selected zero time point, designated by a dashed line Z in FIGS. 6A–6E. The waveform $V_R$ leads waveform $V_S$ by a phase angle of $2\delta$. FIG. 6C shows the voltage waveform $V_T$ supplied by center tap 120 to the harmonic blocking transformer 30 via conductor 70. The waveform $V_T$ is average of the voltage waveforms $V_R$ and $V_S$ shown in FIGS. 6A and 6B. The waveform $V_{RT}$ appears across the first portion 122 of winding 112, and is equal to one-half the difference of waveforms $V_R$ and $V_S$ shown in FIGS. 6A and 6B.

Figure 6E:
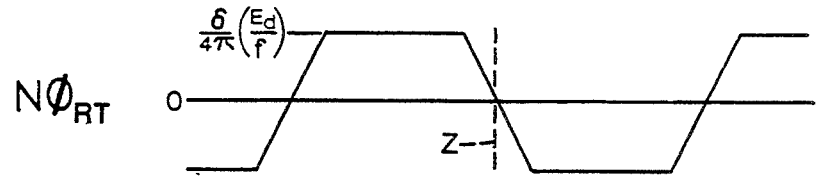

The sizing of the interphase transformers 110 for a stagger angle $\pm\delta$ is illustrated in FIGS. 5 and 6A–6E. The flux linkage required for one winding portion 122 of the interphase transformers 110 is:

$$N\Phi_m = \frac{\delta}{4\pi} \frac{E_d}{f}$$

which is the peak value of the flux linkage in FIG. 6E. However, the fundamental component of the quasi-square waveform $V_T$ is also reduced due to the cosine of the stagger angle. The flux linkage across the winding portion 122 of the interphase transformers 110 is shown in FIG. 6E. So, $$V_m = \frac{2}{\pi} E_d \cos\delta$$

and $$N\Phi_m = \frac{\pi\delta}{4\cos\delta} \frac{V_m}{\omega}$$

For fifth and seventh harmonic reduction, $$N\phi_m = (0.2129)(V_m/\omega) \text{ for } \delta=15°$$

while for eleventh and thirteenth harmonic current reduction, $$N\Phi_m = (0.1037)(V_m/\omega) \text{ for } \delta=7.5°$$

In earlier systems, use of staggered-phasing to reduce the undesirable fifth and seventh harmonic circulating currents in a wye-wye/delta transformer required conventional interphase transformers having a rating of 21% that of the main transformer. Furthermore, these earlier systems required an increase in the voltage of the DC source to: sec $\delta=1.035$ pu, which required the use of a higher rated capacitor.

In contrast, the converter system 12 theoretically eliminates the undesirable fifth and seventh harmonic circulating currents by using harmonic blocker 80 which is rated at only 3.67% the rating of main transformer 32. This theoretical elimination is based upon several simplifying assumptions. First, the magnetizing currents of the interphase transformers 110 are neglected. Second, slight errors in the turning-on time for switching the converter 15 are ignored. Third, the turns ratio of $\sqrt{3}$ is not an exact figure and cannot be practically constructed with a finite number of winding turns, as is known by those skilled in the art.

Conventional prior stages of staggering may be used to reduce the size of the interphase transformers 110. For example, with the interphase transformer 110 as a second tier, two similarly constructed center-tapped transformers (not shown) coupled to the converter 15 may serve as a first tier of interphase transformers. The center-tap outputs of the two first tier interphase transformers each feed one of the R and S terminals 116, 118 of the second tier interphase transformer 110.

Furthermore, the converter system 12 may include additional stagger-phasing interphase transformers (not shown) to reduce the undesirable eleventh and thirteenth harmonic circulating currents. These additional eleventh and thirteenth harmonic reducing interphase transformers may be rated as only 10% that of the main transformer 32.

Multiple Parallel Phase Legs

Referring to FIG. 11, in another embodiment, a waveform enhancer has six enhancer segments as shown above for enhancer 100, with each of the enhancer segments, such as segment 101', including a multiple interphase transformer set 150. The multiple set 150 comprises several standard interphase transformers, such as interphase transformers 152, 154 and 156, in a multiple parallel phase leg arrangement. The interphase transformer 152 has a core 158 about which primary and secondary windings 160 and 162, respectively, are wound. The interphase transformer 154 has core 164 linking primary and secondary windings 166 and 168. The interphase transformer 156 has a core 170 with primary and secondary windings 172 and 174 wound thereon. While an odd number of interphase transformers are illustrated, it is apparent that the multiple interphase transformer sets 150 may each have an even number of interphase transformers, depending upon economic considerations and the type of converter 15 used as known by those skilled in the art.

In each of the multiple interphase transformer sets 150, all of the primary windings 160, 166, and 172 are in parallel and couple the converter 15 with the harmonic blocking transformer 30. For example, referring to enhancer segment 101', a conductor 175 couples the primary windings 160, 166, and 172 with conductor 56 of the harmonic blocking transformer 30. The opposite ends of the primary windings 160, 166, and 172 are coupled in a conventional manner to the converter section 16 by conductors 176, 178 and 180, respectively. The secondary windings 162, 168 and 174 are in series with one another as shown in FIG. 11. The multiple parallel phase legs 160, 166, and 172 may advantageously further reduce the undesirable circulating harmonic currents and allow for the use of a lower rated harmonic blocking transformer 80.

2-Level and 3-Level Voltage Control Embodiments

Figure 7A:
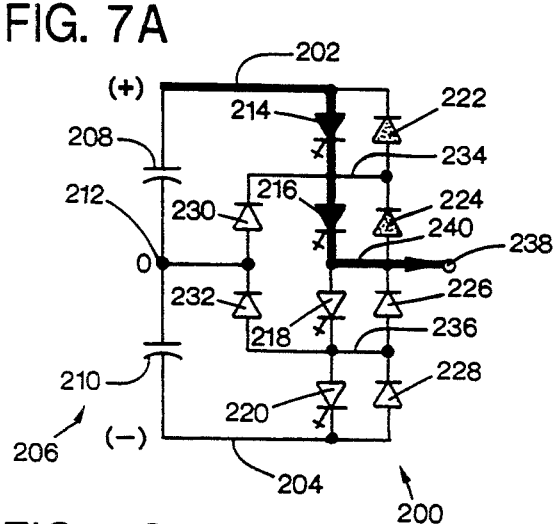
FIGS. 7A–7F are schematic diagrams of one form of a single phase arm of a converter of the present invention which provides 3-level control, shown during various stages of conducting, with the current path shown in heavy black lines.

Referring to FIGS. 7A–7F, a 3-level voltage control scheme for controlling phase arms of an alternate converter bridge is illustrated. FIGS. 7A–7F illustrate a single converter phase arm 200 with different elements conducting, as shown by heavy black lines and blackened components, through different portions of a cycle. Referring to FIG. 7A, the converter arm 200 is coupled between a positive DC bus 202 and a negative DC bus 204. The DC source 206 is connected across the positive and negative DC buses 202, 204. The DC source 206 may include a center-tapped capacitor, illustrated schematically as two discrete capacitors 208 and 210 coupled together by a center tap 212 therebetween. The 3-level converter arm 200 may be substituted for the 2-level converter arm 25 of FIG. 1B if the DC source 14 of FIG. 1B includes a center tap as shown for the DC source 206.

Four switching devices 214, 216, 218 and 220 are connected in series between the positive and negative DC buses 202,204 for conducting current from the positive bus 202 toward the negative bus 204. The switching devices 214–220 are preferably gate turn-off thyristors (GTOs) which advantageously may be turned off upon receipt of a control signal (not shown) whether or not the voltage waveform is at a zero crossing. These GTOs may be rated on the order of 2000–3000 amps at 4.5 kV. Although GTOs are presently the only switching devices known to be capable of handling the high power switching requirements of utility applications, other suitable devices may be used, such as power MOSFETs (metal oxide silicon field effect transistors), power transistors, and the like.

Each of the illustrated GTOs 214–220 are shunted by an antiparallel free-wheeling diode 222, 224,226 and 228, respectively. The diodes 222-228 permit reverse current to flow through converter arm 200 from the negative bus 204 toward the positive bus 202, opposite from the flow of current through the GTOs. Two center tap, mid-point, or auxiliary diodes 230 and 232 are connected to the center tap 212 of the DC source 206.

As shown in FIGS. 7A–7E, the converter arm 200 has a first junction or node conductor 234 that couples GTOs 214 and 216 to diodes 222 and 224. The arm 200 also has a second junction or node conductor 236 that couples GTOs 218 and 220 to diodes 226 and 228. The auxiliary diode 230 delivers current from the center tap 212 to the first junction 234, and diode 232 delivers current from junction 236 to the center tap 212 of the DC source 206.

An input/output terminal 238 is coupled to the junction of diodes 224, 226 and to the junction of GTOs 216, 218 by a conductor 240. The input/output terminal 238 of each converter arm 200 within the 3-level converter is coupled to one of the secondary winding output conductors 56, 58, 60, 68, 70 or 72 of the harmonic blocking transformer 30.

A 3-level voltage control scheme is used to control the switching of the GTOs 214–220 to produce the $V_T$ voltage waveform shown in FIG. 6C without using waveform enhancer 100 with stagger-phasing interphase transformers 110. This 3-level control is illustrated by the various operational modes of the converter arm 200 in FIGS. 7A–7F where the current conducting components, bus and conductors are shown heavily blackened, and the stipple shaded diodes and switching devices indicate that these devices are ready to conduct.

Figure 7B:
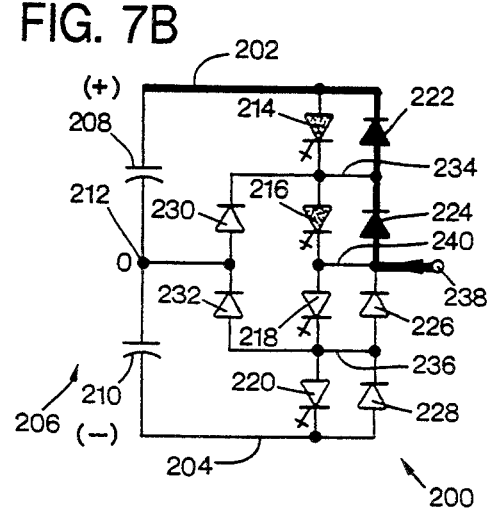
Figure 7C:
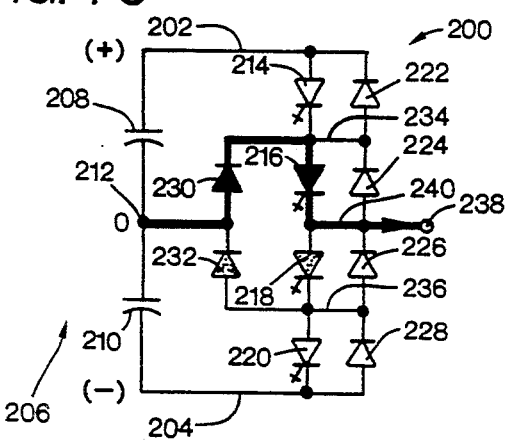
Figure 7D:
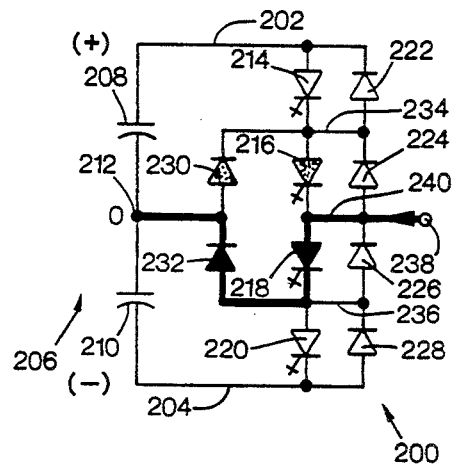
Figure 7E:
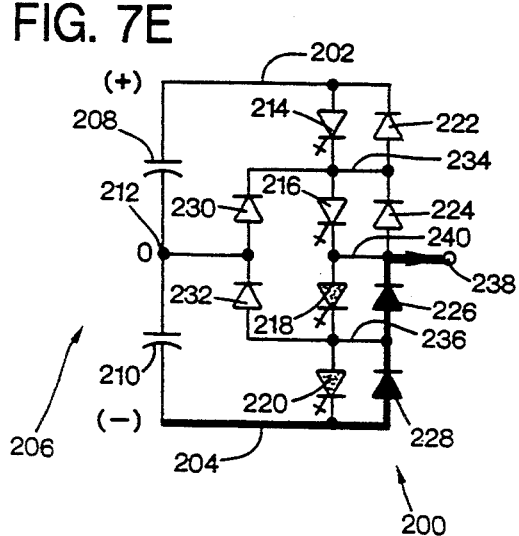
Figure 7F:
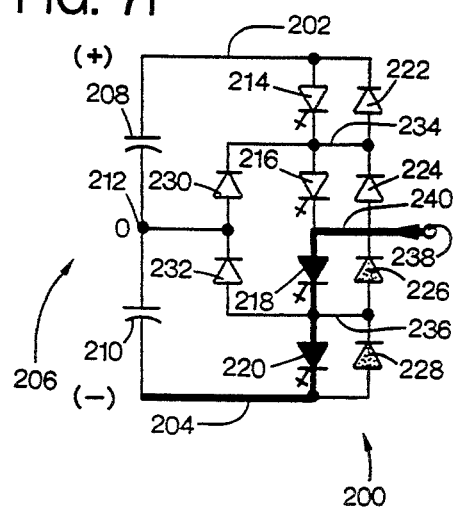

When current is at the positive bus 202, the current path may be as shown in FIGS. 7A or 7B, delivering current either to terminal 238 or therefrom, respectively, to provide the positive portion of the FIG. 6C waveform $V_T$. When current is at the center tap 212, the current path may be as shown in FIGS. 7C or 7D, delivering current either to terminal 238 or therefrom, respectively. Thus, each of the auxiliary diodes 230 and 232 carry the peak load current during the 2δ portion of the $V_T$ voltage waveform of FIG. 6C. When current is at the negative bus 204, the current path may be as shown in FIGS. 7E or 7F, delivering current either to terminal 238 or therefrom, respectively. These conduction paths provide the negative portion of the FIG. 6C waveform $V_T$.

Thus, the term "2-level voltage control" refers to a converter bridge arrangement having 2-level converter arms 25 with two pairs of current paths therethrough from the harmonic blocking transformer to the DC source 14, as shown in FIG. 1B. In 2-level control, reduction of the eleventh and thirteenth harmonic currents is accomplished through use of interphase transformers 110 of the waveform enhancer 100. The term "3-level voltage control" is derived from the three pairs of current paths available through the converter arm 200 from the harmonic blocking transformer 30 to the DC source 14. The first pair of current paths are shown in FIGS. 7A and 7B, the second pair of current paths are shown in FIGS. 7C and 7D, and the third pair of current paths are shown in FIGS. 7E and 7F. Without using the often expensive interphase transformers 110, this 3-level voltage control scheme produces the same quasi-square wave effect as staggered phasing by providing the $V_T$ voltage waveform of FIG. 6C.

Use of either 3-level control or waveform enhancer 100 advantageously reduces the eleventh and thirteenth harmonic currents. The selection of either 3-level control or waveform enhancer 100 depends upon the economics of a particular application, i.e., whether the 10% rated interphase transformers 110 (based upon the main transformer rating) or the additional auxiliary diodes 230 and 232 are the most cost-effective implementation. The use of either stagger-phasing interphase transformers 110 or 3-level control provides several advantages, including a reduction in the size of the harmonic blocker 80, as well as in the main transformer 32, and a reduction in the GTO turn-off rating of the GTOs 214–220 (3-level control) or GTOs 28 (2-level control).

Referring to FIGS. 8A–10D, stagger-phase operation with an angle of $\delta = \pm 7.5°$ is explained to reduce the eleventh and thirteenth harmonic currents. This stagger-phase operation may be implemented using either 3-level control or the interphase transformers 110 of waveform enhancer 100. The voltage and flux linkage waveforms shown in FIGS. 8A–8F are generated by the <0° bridge 16 to feed a six pulse stagger-phased voltage to the wye windings 52 and 82 of the harmonic blocking transformer 30.

Figure 8A:
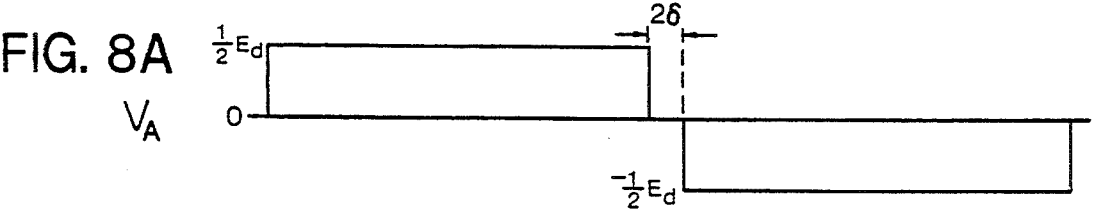

FIG. 8A illustrates the voltage waveform $V_A$ supplied to the conductor 56 of the harmonic blocking transformer 30. The waveforms of FIG. 8A–8C each have the same amplitude as the respective waveforms of FIGS. 2A–2C. Unlike the FIG. 2A waveform, the positive and negative portions of the FIG. 8A waveform $V_A$ are separated by a zero portion of the waveform during an interval 2δ. Similarly, the voltage waveform $V_B$ shown in FIG. 8B is supplied to conductor 58 of the harmonic blocking transformer 30. The FIG. 8B waveform resembles the FIG. 2B waveform $V_B$, except for zero portion separation during an interval 26 of the positive and negative portions of the FIG. 8B waveform $V_B$. The FIG. 8C waveform $V_C$ is supplied to conductor 60, and varies from the FIG. 2C waveform $V_C$ by the zero portion separation of the positive and negative waveform portions during a 26 interval.

FIG. 8D illustrates the average voltage waveform $V_N$ at the neutral point N of the wye windings 52, 82, similar to waveform $V_N$ of FIG. 2D, except the positive and negative portions of the FIG. 8D waveform are separated by a zero portion during an interval 26. As representative of the phase voltages, FIG. 8E illustrates the phase "A" voltage waveform $V_{AN}$ which is difference between the FIG. 8D waveform $V_N$ and the waveform $V_A$ of FIG. 8A. The FIG. 8E waveform $V_{AN}$ has several steps of amplitudes $E_d/3$, $E_d/2$, and $2E_d/3$, beginning to model a sinusoidal waveform, and a separation of 2δ between the positive and negative portions of the waveform.

Similarly, the <30° bridge 18 may be operated to produce a six pulse stagger-phased voltages to feed the harmonic blocking transformer secondary delta windings 54 and 84 to produce the voltage and flux linkage waveforms shown in FIGS. 9A–9E, with the resultant transformer voltage and flux being referred to an equivalent wye system on the side of the AC line source 13. The waveforms of FIG. 9A–9C each have the same amplitude as the respective waveforms of FIGS. 3A–3C. Unlike the FIG. 3A waveform, the positive and negative portions of the FIG. 9A waveform $V_{A'}$ are separated by a zero portion of the waveform during an interval 2δ. Similarly, the voltage waveform $V_{B'}$ shown in FIG. 9B resembles the FIG. 3B waveform $V_{B'}$, except for zero portion separation during an interval 26 of the positive and negative portions of the FIG. 9B waveform $V_{B'}$. The FIG. 9C waveform $V_{C'}$ varies from the FIG. 3C waveform $V_{C'}$ by the zero portion separation of the positive and negative waveform portions during a 2δ interval.

The FIG. 9D voltage waveform $V_{A'N'}$ is derived as described above for the FIG. 3D waveform $V_{A'N'}$, with the neutral value resulting from referring the delta secondary winding values to an equivalent wye system. The waveform $V_{A'N'}$ is stepped with amplitudes of $E_d/\sqrt{3}$ and $E_d/2\sqrt{}$. The dashed waveform in FIG. 9D with a peak value $E_d$ is the difference of the $V_{A'}$ waveform in FIG. 9A and the $V_{C'}$ waveform in FIG. 9C. This dashed waveform of FIG. 9D appears across the delta windings 74 and 94, and becomes $V_{A'N'}$ when referred to the equivalent wye system to obtain values on the same basis as the wye windings 52 and 82. It is apparent that similar waveforms exist for the "B" and "C" phases of windings 54 and 84.

The flux linkage waveforms $N\Phi_{AN}$ and $N\Phi_{A'N'}$ of the respective FIGS. 8F and 9E are generated as described above for the flux linkage waveforms of FIGS. 2F and 3E. The flux waveforms of FIGS. 8F and 9E have a smoother shape than the flux linkage waveforms of FIGS. 2F and 3E. Furthermore, the flux waveforms of FIGS. 8F and 9E are each proportional to the current in a pure inductive load fed by the respective converter sections 16 and 18. The relative flux requirements of harmonic blocking transformer secondary wye windings 52, 82 and delta windings 54, 84 for a stagger-phased operated converter may be compared by expressing the $N\Phi_m$ flux linkages in terms of the peak fundamental voltage generated by the converter 15. For a stagger-phased six pulse converter, the fundamental voltage may be expressed as:

$$V_m = \frac{2}{\pi} E_d \cos\delta$$

Then, by setting $\omega = 2\pi f$, the following may be expressed as:

$$\frac{E_d}{f} = \frac{\pi}{2} \frac{V_m}{\cos\delta} \frac{2\pi}{\omega} = \frac{\pi^2}{\cos 7.5°} \frac{V_m}{\omega}$$

For the wye connected windings 52 and 82, the flux linkage (see waveform $N\Phi_{AN}$ of FIG. 8F) may be expressed as:

$$N\Phi_m = \frac{5}{48} \frac{E_d}{f} = \frac{5}{48} \frac{\pi^2}{\cos 7.5°} \frac{V_m}{\omega} = 1.0370 \frac{V_m}{\omega}$$

For the delta connected windings 54 and 84, the flux linkage (see waveform $N\Phi_{A'N'}$ of FIG. 9E) may be expressed $$N\Phi_m = \frac{1}{6\sqrt{3}} \frac{E_d}{f} = \frac{\pi^2}{6\sqrt{3} \cos 7.5°} \frac{V_m}{\omega} = 0.9579 \frac{V_m}{\omega}$$

Thus, the wye windings 52 and 82 require about 4% more flux linkage than a pure sine wave transformer, whereas the delta windings 54 and 84 require approximately 4% less flux linkage.

The sums and differences of the voltage and flux waveforms for phase "A" shown in FIGS. 8E, 8F, 9D and 9E are shown in FIGS. 10A–10D. FIG. 10A shows the voltage sum waveform ($V_{AN}+V_{A'N'}$) which is the sum of the FIG. 8E waveform $V_{AN}$ and the FIG. 9D waveform $V_{A'N'}$. FIG. 10B shows the flux linkage sum waveform ($N\Phi_{AN}+N\Phi_{A'N'}$) which is the sum of the FIG. 8F waveform $N\Phi_{AN}$ and waveform $N\Phi_{A'N'}$ of FIG. 9E. FIG. 10C shows the voltage difference waveform ($V_{AN}-V_{A'N'}$) which is the difference of the FIG. 8E waveform $V_{AN}$ and the FIG. 9D waveform FIG. 10D shows the flux linkage difference waveform ($N\Phi_{AN}-N\Phi_{A'N'}$) which is the difference of the FIG. 8F waveform $N\Phi_{AN}$ and waveform $N\Phi_{A'N'}$ of FIG. 9E.

The resultant sum voltage waveform ($V_{AN}+V_{A'N'}$) shown in FIG. 10A appears across the AC line source 13 and across the main transformer primary windings 34. In the earlier systems having separate transformers as described in the background portion of the invention, the separate transformers disadvantageously remain unbalanced. However, in the converter system 12 the main voltage and flux is quasi-harmonic neutralized and approaches the performance of a twenty-four pulse converter as shown in FIGS. 10A–10D. Since the fundamental voltage of the effective series combination of the secondary wye windings 52, 82 and the delta windings 54, 84 as seen from the primary windings 34 may be expressed as:

$$V_m = \frac{4}{\pi} E_d \cos 7.5°$$

the flux linkage becomes:

$$N\Phi_m = \frac{15 + 8\sqrt{3}}{144} \frac{E_d}{f} =$$

$$\frac{(15 + 8\sqrt{3})\pi^2}{288 \cos 7.5°} \frac{V_m}{\omega} = 0.9974 \frac{V_m}{\omega}$$

It is clear from the equation above, that the required flux linkage for this embodiment is practically the same as that required for a sine-wave transformer.

The switching times in an advanced static VAR generator (ASVG) employing the converter system 12 is ±7.5° about a crest of the current wave. Therefore, the current in a converter arm 25 or 200 at the time of switching is:

$$I_G = 0.9974 \frac{V_m}{\omega L} - \frac{E_m}{\omega L} \cos 7.5°$$

The peak fundamental component $I_m$ of the current $I_G$ is:

$$I_m = \frac{V_m - E_m}{\omega L}$$

So, $$I_G = 0.9974 \left( I_m + \frac{E_m}{\omega L} \right) - (0.9914) \frac{E_m}{\omega L}$$

$$\frac{I_G}{I_m} = 0.9974 + 0.0060 \frac{E_m}{\omega L I_m}$$

At rated load supplying reactive power (VARs), the peak fundamental component of current may be expressed as:

$$I_m = +\sqrt{2}\ pu,$$

so:

$$I_{Gpu} = \sqrt{2} \left( 0.9974 + \frac{0.0060}{X_{pu}} \right) = (\sqrt{2})(1.0374)$$

for $X_{pu}=0.15$. This current $I_{Gpu}$ must be turned off by a GTO, such as GTO 214, 216, 218 or 220 for the 3-level control embodiment. At rated load absorbing reactive power (VARs), the peak fundamental component of the current is:

$$I_m = -\sqrt{2}\ pu,$$

so:

$$I_{Gpu} = -\sqrt{2} \left( 0.9974 - \frac{0.0060}{X_{pu}} \right) = -(\sqrt{2})(0.9574)$$

for $X_{pu}=0.15$. The current $I_{Gpu}$ initially flows in a diode and must be switched into a GTO in antiparallel with a diode when the GTO turns on or fires. In either the case of supplying or absorbing reactive power, the effect on the switching duty of the remaining harmonics, that is, those greater than the thirteenth harmonic, is very small.

The voltage and flux linkage difference waveforms shown in FIGS. 10C and 10D, respectively, appear across the harmonic blocker 80. The flux linkages at points 300, 302, 304, 306 and 308 indicated in the FIG. 10B flux linkage difference waveform ($N\Phi_{AN}-N\Phi_{A'N'}$) are given by the following equations:

For point 300:

$$N\Phi = \frac{2-\sqrt{3}}{48} \frac{E_d}{f} = 0.005582 \frac{E_d}{f}$$

For point 302:

$$N\Phi = \frac{9 - 5\sqrt{3}}{144} \frac{E_d}{f} = 0.002359 \frac{E_d}{f}$$

For point 304:

$$N\Phi = \frac{11 - 7\sqrt{3}}{144} \frac{E_d}{f} = -0.007808 \frac{E_d}{f}$$

For point 306:

$$N\Phi = \frac{13 - 8\sqrt{3}}{144} \frac{E_d}{f} = -0.005947 \frac{E_d}{f}$$

For point 308:

$$N\Phi = \frac{15 - 8\sqrt{3}}{144} \frac{E_d}{f} = -0.007942 \frac{E_d}{f}$$

As can be seen in FIG. 10D and in the equation above for point 308, the peak differential flux linkage occurs at point 308. Furthermore, this peak differential flux linkage at point 308 occurring across one winding is half of the value indicated above, that is:

$$N\Phi_m = \frac{1}{2}\left[\frac{15 - 8\sqrt{3}}{144}\right]\frac{E_d}{f} =$$

$$\left[\frac{15 - 8\sqrt{3}}{144}\right]\frac{\pi^2}{4\cos 7.5°}\frac{V_m}{\omega} = 0.01976 \frac{V_m}{\omega}$$

Thus, the rating of the harmonic blocker 80, with 2-level control using the waveform enhancer 100 having interphase transformers 110 with staggered-phase legs, is less than 2% the rating of the main transformer 32.

Without the harmonic blocker 80, the voltage difference shown in FIG. 10C would drive an undesirable circulating current between the secondary wye and delta windings of the main transformer. This undesirable circulating current would be limited only by the leakage inductance between these windings. Furthermore, this circulating current would have the same waveform as the flux waveform shown in FIG. 10D. If, as discussed above with respect to the waveforms of FIGS. 4A–4D, the transformer leakage inductance is assumed to be split equally between the primary windings 34 and the secondary windings 50 (0.5 pu for the primary windings 34 and 1.0 pu for each of the secondary winding 52 and 54), then the peak circulating current $I_c$ (which is to be distinguished from any current flowing through phase "C" of the transformer) may be expressed as:

$$I_c = 0.01976 \frac{V_m}{\omega L}$$

In this example, the peak current in a GTO is increased to:

$$I_G' = I_G + I_c = 1.0172 \frac{V_m}{\omega L} - 0.9914 \frac{E_m}{\omega L}$$

So $$I_{Gpu}' = \sqrt{2}\left(1.0172 + \frac{0.0258}{X_{pu}}\right) = (\sqrt{2})(1.1892)$$

for $X_{pu} = 0.15$. This value for $I_{Gpu}'$ is a 15% increase over $I_{Gpu}$, which determines the required GTO turn-off rating. While this is a relatively small increase in rating, so a stagger-phased advanced static VAR generator (ASVG) may be operated without the harmonic blocker 80 of converter system 12, the use of GTOs having a 15% increased turn-off rating with the harmonic blocker further allows for a 15% increase in overload capacity when the system is operating to supply reactive power (VARs).

Method of Reducing Undesirable Harmonic Currents

A method of reducing undesirable harmonic currents in the converter system 12 for converting power between the AC source 13 and the DC source 14 is also provided. Converter 15 typically generates undesirable harmonic currents including fifth, seventh, eleventh and thirteenth harmonic components. These harmonic currents have a tendency to flow in the secondary windings of the harmonic blocking transformer 30.

To reduce these undesirable harmonic currents, the method includes the step of coupling the polyphase harmonic blocker 80 with the main transformer 32. This coupling step may be achieved by coupling the first blocking coil set 82 to the wye winding set 52 for a subtractive current therebetween, and by coupling the second blocking coil set 84 to the delta winding set 54 for an additive current therebetween. In a blocking step, the fifth and seventh harmonic components of the harmonic currents are substantially blocked from circulating in the main transformer secondary windings 50 using the harmonic blocker 80.

This method may also include the step of coupling plural center-tapped interphase transformers 110 between the converter 15 and main transformer secondary windings 50 by coupling the winding ends 116 and 118 of each interphase transformer 110 to the converter 15 and by coupling the center tap 120 to the secondary windings 50. In a stagger-phasing step, stagger-phasing waveforms are supplied by the converter 15 to each center-tapped interphase transformer 110 by controlling converter 15. The converter 15 is controlled to supply winding end 116 with a first shifted waveform which is shifted by a first phase angle ahead of a selected point in time, and to supply winding end 118 with a second shifted waveform which is shifted by a second phase angle behind this selected point in time. Preferably, the first and second phase angles, such as 6 discussed above, are equal. The converter 15' may be so controlled as described above to substantially reduce the eleventh and thirteenth harmonic current components.

This method may also use a 3-level converter, as described above with respect to FIGS. 7A–7E, configured for 3-level control. The method may include the step of applying 3-level control to the 3-level converter to provide a first three phase waveform to the wye windings 52, 82 and a second three phase waveform to the delta windings 54, 84. Each cycle of the first and second three phase waveforms preferably has positive and negative amplitude portions separated by a zero amplitude portion, such as during the 26 interval discussed above. The first and second three phase waveforms preferably have a 30° phase shift therebetween, to provide a quasi-24-pulse harmonic neutralization.

The method may include further harmonic neutralization by including the step of coupling a waveform enhancer having plural interphase transformers 150 with multiple parallel phase legs coupling the converter with the harmonic blocking transformer 30, as described with respect to FIG. 11.

Figure 12:
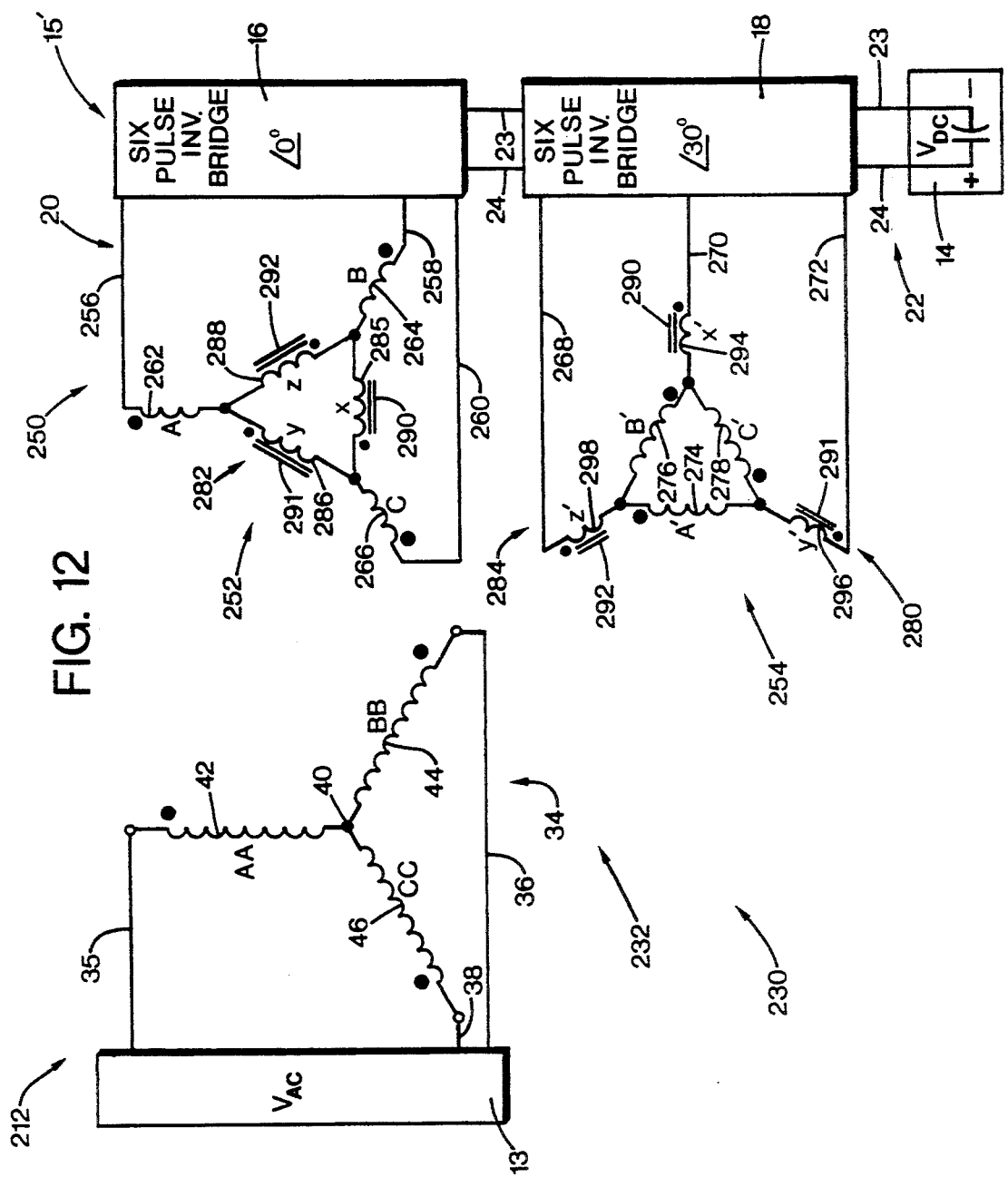
FIG. 12 is a schematic block diagram of an alternate form of a converter system of the present invention including a harmonic blocking transformer and a converter for transferring power between an AC source and a DC source.

Neutral-Coupled Wye and Externally-Coupled Delta Harmonic Blocking Converter System Referring to FIG. 12, a second embodiment of a converter system 212 constructed in accordance with the present invention is shown for converting AC and DC power between an AC power source 13, and a DC power source 14, as described above, with respect to FIGS. 1A and 1B. As shown in FIG. 1A, the DC source 14 of system 212 is coupled by conductors 23 and 24 to a converter 15' comprising converter sections 16 and 18. It is apparent that converter 15 of FIG. 1B may also be substituted for converter 15' in FIG. 12.

A harmonic blocking transformer 230 couples the AC source 13 to the parallel converter bridges 16, 18. The blocking transformer 230 includes a conventional transformer, such as a 3-phase main transformer 232 having primary windings 34 coupled with AC source 13, as described above with respect to FIGS. 1A and 1B. The main transformer 232 has secondary windings 250, which are magnetically coupled with the primary windings 34. The secondary windings 250 include a first set of windings 252 and a second set of windings 254 connected in delta. The first set of windings 252 are coupled by conductors 256, 258 and 260 to the AC side 20 of the bridge 16. The winding set 252 includes a first "A" winding 262, a second "B" winding 264, and a third "C" winding 266, coupled to the respective conductors 256, 258 and 260.

The delta windings 254 are coupled by conductors 268, 270 and 272 to the AC side of bridge 18. The delta windings 254 include: a first winding 274, labeled as phase A' and coupled between conductors 268 and 272; a second winding 276 labeled phase B' and coupled between conductors 268 and 270; and a third winding 278 labeled phase C' and coupled between conductors 270 and 272. The phases of the secondary windings 252 and 254 are magnetically coupled in conventional phase relationship with the respective phases of the primary windings 34.

The cores for the main transformer 232 have been omitted for clarity from FIG. 12, as they are conventional and well-known to those skilled in the art. Indeed, the main transformer 232, comprising main windings 42, 44, 46, secondary "wye" windings 262, 264, 266, and secondary delta windings 274, 276 and 278, may be constructed as described above with respect to main transformer 32 of FIGS. 1A and 1B. The dot convention in FIG. 12 to indicate the relative polarity of the rated coils within respect to their common cores (not shown) is the same as described above with respect to FIGS. 1A and 1B.

The converter system 212 also includes a polyphase harmonic blocker, illustrated as a three-phase harmonic blocker 280. The harmonic blocker 280 blocks selected harmonics of the harmonic currents generated by the converter 15', so the harmonic content is the same as illustrated above with respect to FIGS. 1A and 1B. However, it is apparent that the voltage waveforms within the windings of the harmonic blocker 280 will be different from those illustrated previously with respect to the embodiments of FIGS. 1A and 1B. The harmonic blocker 280 has first and second blocking winding or coil sets 282 and 284 which are oppositely polarized, as described above with respect to blocker 80. The term "coil" is used herein for convenience to refer to the structure of harmonic blocker 280, as described above with respect to blocker 80.

In the illustrated embodiment, the first set of blocking coils 282 comprises a delta connection of coils located at what would otherwise be the neutral tie of a wye connection of the first set: of secondary windings 252 of the main transformer 232. The blocking coil set 282 includes a first coil 285 labeled phase x, a second coil 286 labeled phase y, and a third coil 288 labeled phase z. The x blocking coil 285 is coupled between the phase B and C windings 264 and 266; the phase y blocking coil 286 is coupled between the phase A and C windings 262 and 266; and the phase z blocking coil 288 is coupled between the phase A and B windings 262 and 264.

The illustrated harmonic blocker 280 includes three blocking magnetic cores 290, 291 and 292, which may be configured as three separate magnetic structures, or each core may be one leg of a three-legged magnetic structure. As described above with respect to FIGS. 1A and 1B, the larger dots correspond to the polarity of the main transformer secondary windings 252, 254, whereas the smaller dots refer to the polarity of the harmonic blocking transformer 280.

The second coil set 284 of harmonic blocker 280 includes a first coil 294 labeled phase x' a second coil 296 labeled phase y', and a third coil 298 labeled phase z'. In the illustrated embodiment, the blocking coils 294, 296 and 298 are coupled in series with the respective conductors 270, 272 and 268. The x' coil 294 is also coupled to the phase B' and C' windings 276 and 278. The y' coil 296 is coupled to the phase A' and C' windings 274 and 278. The z' coil 298 is coupled to the phase A' and B' windings 274 and 276.

The harmonic blocker coil sets 282 and 284 are magnetically linked together by the blocking cores 290, 291 and 292. For example, the phase x and x' coils 285 and 294 are both magnetically linked together and wound around core 290. The harmonic blocker coils are wound to provide subtractive fluxes for each phase between the first and second coil sets 282 and 284. In this manner, any fundamental current component flowing through the blocking coils cancels out the fundamental flux component in the blocking cores 290, 291, 292, which desirably causes no blocking effect to impede the fundamental frequency.

Alternatively, the blocking coils 282 may be coupled to the main transformer secondary windings 252 to provide an additive current therebetween. In this embodiment, the blocking coils 284 are coupled to the main transformer delta windings 254 to provide a subtractive current therebetween. In this manner, each phase of the harmonic blocking coils is still wound about their respective cores with opposite polarities to provide a subtractive flux between the first and second blocking coil sets 282 and 284.

This oppositely polarized winding configuration of the harmonic blocker 280, combined with the neutral and series coupling with the main transformer secondary windings 252 and 254, respectively, allows the harmonic blocker 280 to suppress the undesirable effects of any fifth and seventh harmonic currents flowing through the main transformer secondary windings 250. The manner of accomplishing this harmonic-blocking effect exhibits different voltage waveforms from those described above with respect to the phase a, b, c and a', b', c' windings 85, 86, 88, and 94, 96, 98, of FIGS. 1A and 1B. However, the resulting harmonic content is the same as illustrated above with respect to the FIGS. 1A and 1B embodiment.

A particular advantage of the illustrated converter system 212 is that only two windings are required per reactor leg, which advantageously allows zero sequence currents to flow freely in the main transformer. Moreover, the FIG. 12 embodiment avoids interfering with the main delta winding loop by inserting the secondary blocking coils 284 in series with the conductors leading into the delta connection windings 254. Furthermore, the delta connection of blocking coils 282 at the otherwise neutral tie of "wye" coupled windings 252 avoids the need for three separate series connections, as illustrated in FIG. 1A. Thus, the main secondary windings 250 may be constructed within a single transformer tank enclosure, with the harmonic blocker 280 coupled internally or externally thereto, in what would otherwise be the neutral point of the secondary wye windings 252, and in series with the conductors coupling the secondary delta windings 254 with the bridge 18.

Conclusion

Having illustrated and described the principles of my invention with respect to the preferred embodiments, it should be apparent to those skilled in the art that my invention may be modified in arrangement and detail without departing from such principles. For example, other types of power switching devices other than GTOs described herein may be employed in the converter. Furthermore, other arrangements of the diodes 27 and GTOs 28 may be substituted for the illustrated arrangement of converter 15, as are known to those skilled in the art. I claim all such modifications falling within the scope and spirit of the following claims.

I claim:

1. A converter system for converting power between an AC power source and a DC power source, comprising:
    a polyphase main transformer having primary and secondary windings, said primary winding having a primary wye winding set for coupling to said AC power source, and said secondary windings comprising a first delta winding set and a second delta winding set, said first delta winding set having first, second, and third delta input nodes, said second delta winding set having fourth, fifth, and sixth delta input nodes that are not connected to said first, second and third delta input nodes and thereby establish electrical isolation between said first delta winding set and said second delta winding set;
    a converter coupled to said secondary windings the to said DC power source for transferring power therebetween, said converter generating harmonic currents; and
    a polyphase harmonic blocker for blocking selected harmonics of said harmonic currents, said harmonic blocker having first and second blocking coil sets, said first blocking coil set connected between said converter and said first delta winding set, and said second blocking coil set connected between said converter and said second delta winding set, with one of the first and second blocking coil sets providing an additive secondary current, and the other of said first and second blocking coil sets providing a subtractive secondary current, said additive secondary current and said subtractive secondary current reducing harmonics at said primary wye winding set.

2. A converter system according to claim 1 wherein the converter comprises a twelve pulse voltage source converter having first and second six pulse voltage source converter sections each having an AC side and a DC side, the second converter section being phase displaced by 30° from the first converter section, with the first converter section AC side coupled to the first secondary winding set and the second converter section AC side coupled to the delta secondary winding set, and with the DC sides of the first and second converter sections for coupling to the DC source.

3. A converter system according to claim 1 wherein the converter comprises a plurality of thyristor-diode sets each comprising a gate turn-off thyristor in antiparallel with a diode, the converter also has first and second converter sections each having an AC side and a DC side, with the thyristor-diode sets being arranged in a three phase bridge configuration in each of the first and second converter sections to provide two-level control.

4. A converter system according to claim 1 for use with a DC source having positive and negative buses with a center tap therebetween, wherein the converter comprises first and second converter sections, and the converter further comprises plural thyristor-diode sections arranged in a three phase bridge configuration in each of the first and second converter sections to link the DC source positive and negative buses together, with each thyristor-diode section including four thyristor-diode pairs, each thyristor-diode pair comprising a gate turn-off thyristor in antiparallel with a diode, and each thyristor-diode section further including a pair of auxiliary diodes coupling the thyristor-diode pairs to the DC source to provide three-level control.

5. A converter system according to claim 4 wherein each gate turn-off thyristor conducts current in a first direction from one of the positive and negative buses toward the other of the positive and negative buses, and each diode of the thyristor-diode pairs conducts current in a second direction opposite said first direction.

6. A converter system according to claim 4 wherein each thyristor-diode section also has an output terminal and first and second junction points, with a first of the thyristor-diode pairs coupling the positive bus to the first junction point, a second of the thyristor-diode pairs coupling the first junction point to the output terminal, a third of the thyristor-diode pairs coupling the output terminal to the second junction point, and a fourth of the thyristor-diode pairs coupling the second junction point to the negative bus, with one of the auxiliary diodes conducting from the DC source center tap to the first junction point, and the other of the auxiliary diodes conducting from the second junction point to the DC source center tap.

7. A harmonic blocking transformer for coupling an AC power source to a converter, said converter generating undesirable harmonic currents including fifth and seventh harmonic components, said harmonic blocking transformer comprising:
    a polyphase main transformer having primary and secondary windings, said primary winding having a primary wye winding set for coupling to said AC power source, and said secondary windings comprising a first delta winding set and a second delta winding set, said first delta winding set having first, second, and third delta input nodes, said second delta winding set having fourth, fifth, and sixth delta input nodes that are not connected to said first, second and third delta input nodes and thereby establish electrical isolation between said first delta winding set and said second delta winding set; and a polyphase harmonic blocker having first and second blocking coil sets, said first blocking coil set connected between said converter and said first delta winding set, and said second blocking coil set connected between said converter and said second delta winding set, with one of the first and second blocking coil sets providing an additive secondary current, and the other of said first and second blocking coil sets providing a subtractive secondary current, said additive secondary current and said subtractive secondary current reducing harmonics at said primary wye winding set.

8. A converter system according to claim 7 wherein the main transformer and the harmonic blocker are housed in separate tanks.

9. A converter system according to claim 7 wherein:
the main transformer comprises a three phase main transformer unit;
the harmonic blocker comprises a three phase blocking transformer unit; and
both the main and blocking transformer units are housed in a common tank.

10. A converter system according to claim 7 wherein:
the main transformer comprises three single-phase main transformer units;
the harmonic blocker comprises three single-phase blocking transformer units; and
the converter system includes three separate transformer tanks, with each tank housing one of the main transformer units and one of the blocking transformer units.

11. A converter system according claim 7 wherein the harmonic blocker is a three phase unit having a single three-legged core with one phase being wound on each leg thereof.

* * * * *